United States Patent
Olsson et al.

(10) Patent No.: US 7,221,136 B2
(45) Date of Patent: May 22, 2007

(54) SONDES FOR LOCATING UNDERGROUND PIPES AND CONDUITS

(75) Inventors: Mark S. Olsson, La Jolla, CA (US); Jan Soukup, San Diego, CA (US); Jeffrey A. Prsha, San Diego, CA (US); Michael E. Turgeon, San Diego, CA (US); David A. Cox, San Diego, CA (US); Ray Merewether, La Jolla, CA (US)

(73) Assignee: Seektech, Inc., San Diego, CA (US)

(*) Notice: Subject to any disclaimer, the term of this patent is extended or adjusted under 35 U.S.C. 154(b) by 87 days.

(21) Appl. No.: 10/886,856

(22) Filed: Jul. 8, 2004

(65) Prior Publication Data

US 2006/0006875 A1  Jan. 12, 2006

(51) Int. Cl.
*G01R 19/00* (2006.01)
*G01R 33/00* (2006.01)
(52) U.S. Cl. .................. 324/67; 324/329; 324/244
(58) Field of Classification Search ............ 324/66–67, 324/244, 329
See application file for complete search history.

(56) References Cited

U.S. PATENT DOCUMENTS

| | | |
|---|---|---|
| 2,601,249 A | 6/1952 | Brenholdt |
| 2,820,959 A | 1/1958 | Bell |
| 2,908,863 A | 10/1959 | Neff |
| 3,597,680 A | 8/1971 | Haddon ................. 324/67 |
| 3,718,930 A | 2/1973 | McCullough et al. |
| 3,746,106 A | 7/1973 | McCullough et al. ........ 175/45 |
| 4,674,579 A | 6/1987 | Geller et al. ............... 175/45 |
| 4,907,658 A | 3/1990 | Stangl et al. .............. 175/19 |
| 5,337,002 A | 8/1994 | Mercer .................. 324/326 |
| 5,530,357 A | 6/1996 | Cosman et al. ........... 324/326 |
| 5,633,589 A | 5/1997 | Mercer .................. 324/326 |
| 5,872,703 A | 2/1999 | Williams et al. ............ 363/17 |
| 6,088,580 A | 7/2000 | Powlousky .............. 455/95 |
| 6,260,634 B1 | 7/2001 | Wentworth et al. ......... 175/61 |
| 6,452,396 B2 * | 9/2002 | Ott et al. ................ 324/327 |
| 6,644,421 B1 | 11/2003 | Long ..................... 175/40 |

OTHER PUBLICATIONS

Protetek AT-12 and FT-8 data sheets from the Internet (4 pgs.).

* cited by examiner

*Primary Examiner*—Bot LeDynh
(74) *Attorney, Agent, or Firm*—Michael H. Jester

(57) ABSTRACT

A sonde includes an elongate flexible ferromagnetic core and a coil surrounds an intermediate segment of the core. A housing surrounds and supports the coil. An electronic drive circuit is mounted in the housing for supplying the coil with an electric signal that will induce the core to emit electromagnetic signals at a predetermined strength and frequency that can be remotely detected. Self-contained battery powered float-type and pill-type sondes are also disclosed.

15 Claims, 20 Drawing Sheets

SONDES FOR LOCATING UNDERGROUND PIPES AND CONDUITS

CROSS-REFERENCE TO RELATED APPLICATION

This application claims priority off of U.S. patent application Ser. No. 10/061,887 filed Jan. 31, 2002, now U.S. Pat No. 6,958,767 granted Oct. 25, 2005.

FIELD OF THE INVENTION

The present invention relates to electronic systems and methods for locating buried or otherwise inaccessible pipes and other conduits by detecting electromagnetic emissions from an inserted source.

BACKGROUND OF THE INVENTION

There are many situations where is it desirable to locate buried pipes and other conduits. For example, prior to starting any new construction that involves excavation it is important to locate underground water pipes, sewer pipes, septic tanks, reservoirs, gas lines, fiber optic cable conduits, etc. As used herein the term "buried" refers not only to pipes and conduits below the surface of the ground, but in addition, to objects located inside walls, between floors in multi-story buildings or cast into concrete slabs, etc. If a back hoe or other excavation equipment severs a water main, gas line or a sewer line this can lead to extensive damage and messy cleanups. Serious injury or even death can result from inadvertently piercing a gas line during excavation when the gas is ignited.

Buried objects can be located by sensing an electromagnetic signal emitted by the same. Some buried cables such as power lines are already energized and emit their own long cylindrical electromagnetic field and can be located through a process referred to as "line tracing." Metal pipes and conduits can be energized with an outside electrical source having a frequency typically in a range of approximately 4 Hz to 500 kHz in order to enable them to be located.

A sonde (also called a transmitter, beacon or duct probe) can also be used to locate buried pipes, conduits, horizontal directional drills and reservoirs. A sonde typically includes a coil of wire wrapped around a ferromagnetic core. The coil is energized at a desired frequency, typically in a range of approximately 4 Hz to 500 kHz. A sonde generates a different electromagnetic field than that produced by an energized line. A typical low frequency sonde does not strongly couple to other objects and thereby produce complex interfering fields that can occur during tracing. Therefore, a sonde can be localized to a single point. To take advantage of this feature, a sonde can be constructed as a self-contained unit that can be flushed down a pipe. Alternatively, a sonde can be coupled to a rugged camera head as part of a video pipe inspection system to thereby enable defects and blockages to be precisely located. An example of a hand-held portable locator that can be used to locate a sonde is disclosed in co-pending U.S. patent application Ser. No. 10/268,641 filed Oct. 9, 2002 of Mark S. Olsson et al. entitled OMNIDIRECTIONAL SONDE AND LINE LOCATOR.

Sondes are sometimes integrated into camera heads in video pipe inspection systems. They can also be attached to sewer snakes, drain cleaners and horizontal drill heads. Sondes are also available that are not attached to any guiding structures or remote power sources, but are flushed down a pipe, for example. These include battery powered float-type sondes that are buoyant and battery powered pill-type sondes which do not float and have an elongate configuration.

Sondes that have heretofore been developed have not had a construction that optimizes both utility and durability.

SUMMARY OF THE INVENTION

In accordance with one aspect of the present invention a sonde includes an elongate flexible ferromagnetic core, a coil surrounding a portion of the core, and a housing surrounding the coil. An electronic drive circuit is mounted in the housing and is connected to the coil for supplying the coil with an electric signal that will induce the core to emit electromagnetic signals at a predetermined strength and frequency that can be remotely detected.

In accordance with another aspect of the present invention a sonde includes a water-tight generally spherical float housing. A ferromagnetic core is mounted inside the float housing and a coil surrounds the core. A battery holder is mounted inside the float housing. An electronic drive circuit is mounted inside the float housing and is powered by the battery for supplying the coil with an electric signal that will induce the core to emit electromagnetic signals at a predetermined strength and frequency that can be remotely detected.

In accordance with still another aspect of the present invention, a sonde includes a cylindrical hollow tube made of a ferromagnetic material and configured to removably receive a battery. A coil surrounds the tube. An electronic drive circuit is connectable to the battery for supplying the coil with an electric signal that will induce the tube to emit electromagnetic signals at a predetermined strength and frequency that can be remotely detected. A water-tight housing surrounds and encloses the coil and the electronic drive circuit. An end cap is connectable to a rear end of the tube for sealing the same and is configured for coupling to a snake or a drain cleaning machine.

In accordance with still another aspect of the present invention, a sonde includes a cylindrical hollow tube made of a ferromagnetic material and configured to removably receive a battery. A coil surrounds the tube. An electronic drive circuit abuts an end of the tube or is longitudinally spaced from the end of the tube and is connectable to the battery for supplying the coil with an electric signal that will induce the tube to emit electromagnetic signals at a predetermined strength and frequency that can be remotely detected. A water-tight housing made of over-molded plastic surrounds and encloses the coil and the electronic drive circuit. An end cap is connectable to a rear end of the tube for sealing the same and is configured for coupling to a snake or a drain cleaning machine.

In accordance with still another aspect of the present invention, a sonde includes a cylindrical hollow tube made of a ferromagnetic material and configured to removably receive a battery. A coil surrounds the tube. An electronic drive circuit is connectable to the battery for supplying the coil with an electric signal that will induce the tube to emit electromagnetic signals at a predetermined strength and frequency that can be remotely detected. A water-tight housing surrounds and encloses the coil and the electronic drive circuit. An end cap is connectable to a rear end of the tube for sealing the same. An illumination device is mounted behind a transparent portion of the housing and is energized by the battery for indicating a status of the electronic drive circuit.

In accordance with still another aspect of the present invention, a sonde includes a cylindrical hollow tube made of a ferromagnetic material and configured to removably receive a battery. A coil surrounds the tube. An electronic drive circuit is connectable to the battery for supplying the coil with an electric signal that will induce the tube to emit electromagnetic signals at a predetermined strength and frequency that can be remotely detected. A water-tight housing surrounds and encloses the coil and the electronic drive circuit. An end cap is connectable to a rear end of the tube for sealing the same. A waterproof switch which is manually actuable by twisting the end cap for turning the electronic drive circuit ON and OFF.

In accordance with still another aspect of the present invention, a sonde includes a cylindrical hollow tube made of a ferromagnetic material and configured to removably receive a battery. A coil surrounds the tube. An electronic drive circuit is connectable to the battery for supplying the coil with an electric signal that will induce the tube to emit electromagnetic signals at a predetermined strength and frequency that can be remotely detected. A water-tight housing surrounds and encloses the coil and the electronic drive circuit. An end cap is connectable to a rear end of the tube for sealing the same. A tubular protective outer case encloses the water-tight housing and has a sealed rear end configured for coupling to a drain cleaning machine. A closure plug is inserted into a forward end of the protective outer case.

In accordance with still another aspect of the present invention a sonde includes a ferromagnetic core, a coil surrounding the core, a housing surrounding the core, and a holder inside the housing for at least one battery. An electronic drive circuit is mounted inside the housing and can be powered by the battery for supplying the coil with an electric signal that will induce the core to emit electromagnetic signals at a predetermined strength and frequency that can be remotely detected. The circuit includes an illumination device mounted behind a transparent portion of the housing. The electronic drive circuit energizes the illumination device using power from the battery to indicate a status of the electronic drive circuit.

In accordance with still another aspect of the present invention a sonde includes a ferromagnetic core, a coil surrounding the core, and a housing surrounding the core. An electronic drive circuit is mounted inside the housing for supplying the coil with an electric signal that will induce the core to simultaneously emit electromagnetic signals at a plurality of pre-selected frequencies.

In accordance with still another aspect of the present invention, a sonde includes a ferromagnetic core, a coil surrounding the core, and a battery holder. A water-tight housing surrounds the core and the battery holder. An electronic drive circuit is mounted inside the housing and is connected to the battery holder. The electronic drive circuit supplies the coil with an electric signal that will induce the core to emit electromagnetic signals at a pre-selected frequency. The electronic drive circuit includes a diode and capacitor arranged to prevent feedback of power to a battery mounted in the battery holder and to increase an output power of the coil.

DETAILED DESCRIPTION

Figure 1:
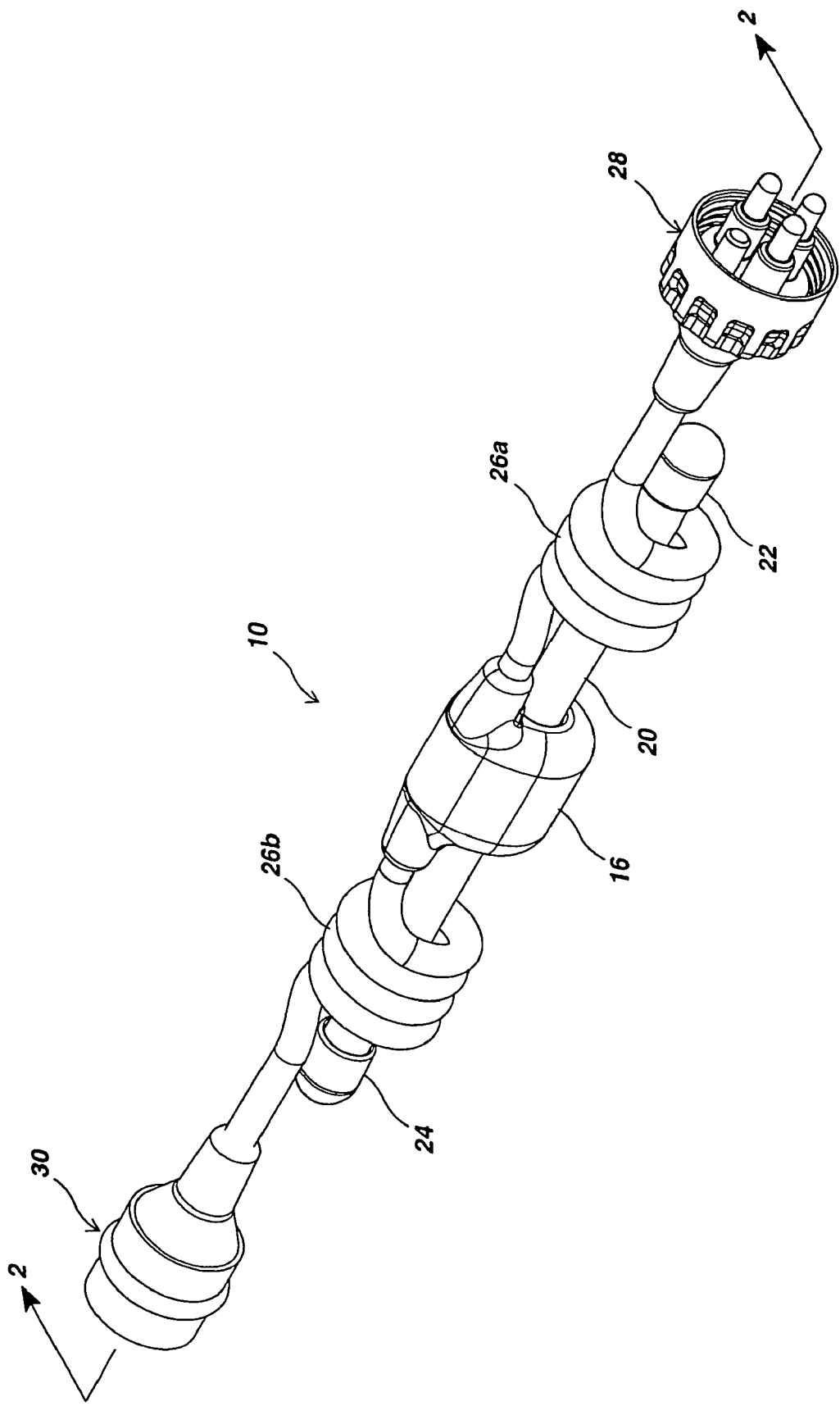
FIG. 1 is an enlarged isometric view of a flexible-type sonde configured for use as a component of a video pipe inspection system.
Figure 2:
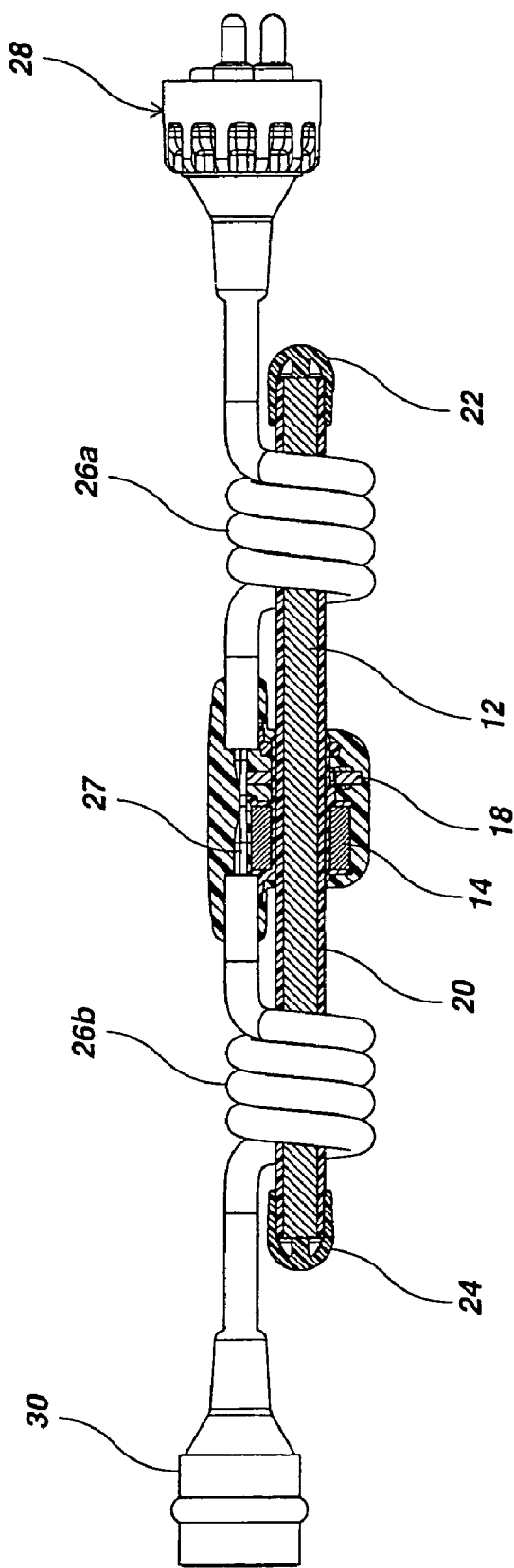
FIG. 2 is a part elevation, part longitudinal sectional view of the flexible-type sonde of FIG. 1 taken along line 2—2 of FIG. 1.
Figure 3:
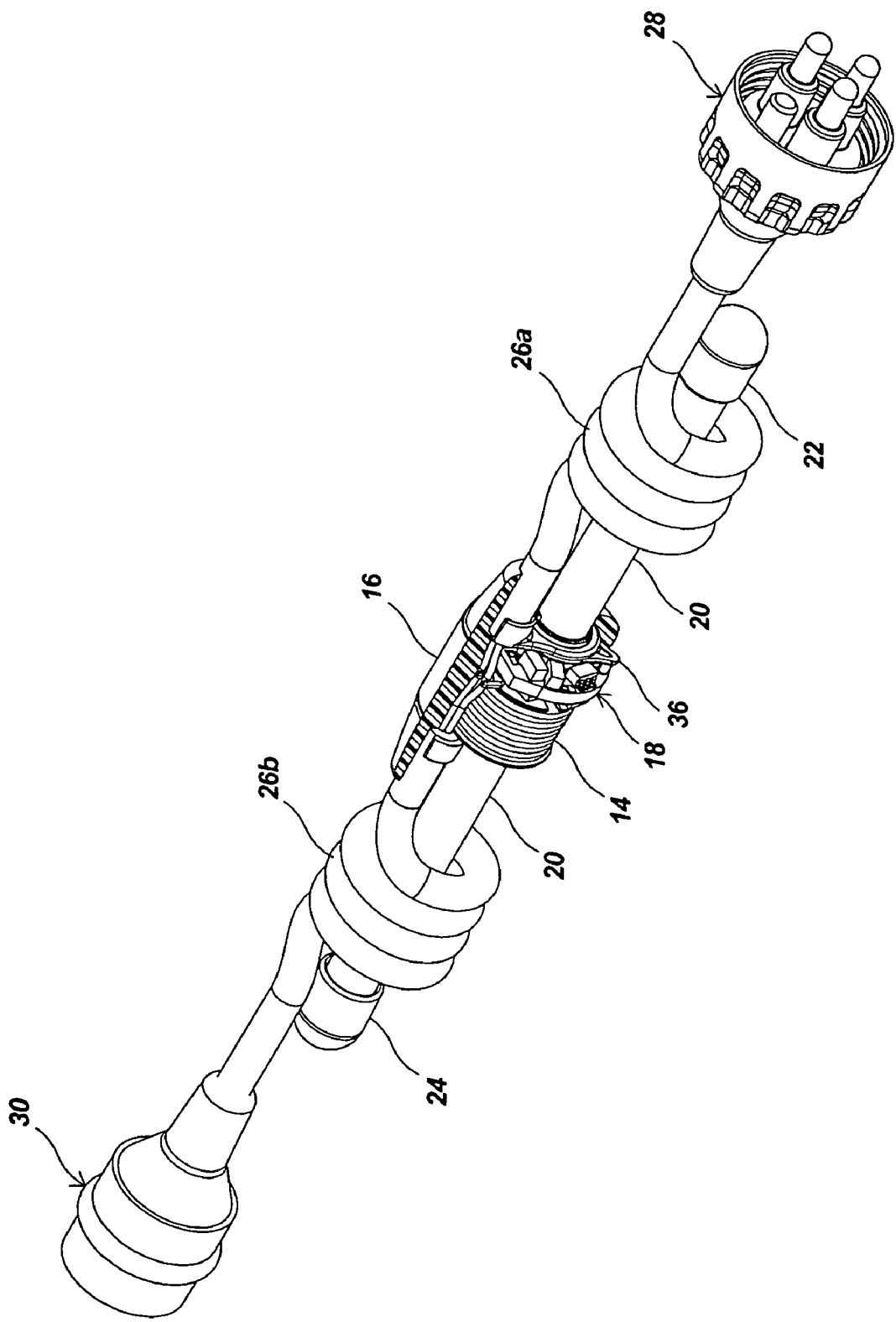
FIG. 3 is an enlarged isometric view of the flexible-type sonde similar to FIG. 1 but with portions cut away to illustrate further details of the coil and electronic drive circuit inside of its waterproof housing.

Referring to FIG. 1, a first embodiment of our invention is illustrated in the form of a flexible-type sonde 10 that is configured for use as a component of a video pipe inspection system. See, for example, co-pending U.S. patent application Ser. No. 10/061,887 filed Jan. 31, 2002 of Mark S. Olsson et al. entitled VIDEO PIPE INSPECTION SYSTEM EMPLOYING NON-ROTATING CABLE STORAGE DRUM, the entire disclosure of which is hereby incorporated by reference. Said application is assigned to DeepSea Power and Light, the assignee of the present application. The flexible-type sonde 10 is surrounded by a tubular stainless steel coil spring (not illustrated). The flexible-type sonde 10 connects a plurality of conductors extending from the distal end of a resilient flexible video push cable (not illustrated) to the rear end of a rugged video camera head (not illustrated). One or more steel cables (not illustrated) provide a connection between a termination assembly connected to the distal end of the push cable and the rear end of the video camera head to enable the camera head to be pulled out of the pipe in the case of jams. The flexible-type sonde 10 includes an elongate ferromagnetic core 12 (FIG. 2) and a coil 14 made of suitably insulated wire that surrounds a short intermediate segment of the core 12. A waterproof housing 16 (FIG. 1) surrounds and supports the coil 14. An electronic drive circuit 18 (FIG. 3) is mounted inside the housing 16 for supplying the coil 14 with an oscillating electric signal that will induce the core 12 to emit electromagnetic signals at a predetermined optimum strength and frequency, (e.g. 512 Hz) that can be remotely detected.

The flexible-type sonde 10 may also be a component of a video pipe inspection system with means for mechanically or electronically leveling the video image, such as that disclosed in co-pending U.S. patent application Ser. No. 10/858,628 filed Jun. 1, 2004 of Mark S. Olsson et al. entitled SELF-LEVELING CAMERA HEAD, the entire disclosure of which is hereby incorporated by reference. Said application is also assigned to DeepSea Power and Light, the assignee of the present application.

Figure 5:
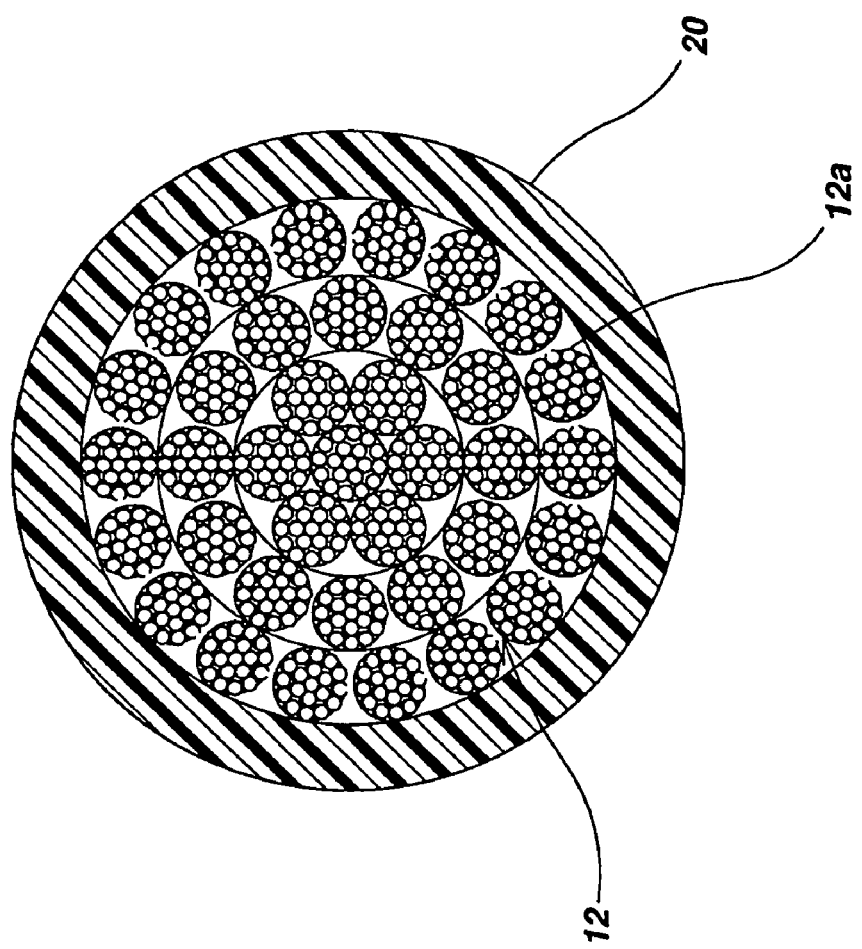
FIG. 5 is a greatly enlarged cross-sectional view of the flexible wire rope core and surrounding waterproof jacket of the flexible-type sonde of FIG. 1.

The core 12 (FIG. 2) is approximately four inches in length and three-sixteenths inches in diameter and is made of flexible wire rope made of a plurality of individual bundles 12a (FIG. 5) of parallel fine gauge wires of low carbon steel providing the core 12 with high magnetic permeability. Other high magnetic permeability/low loss flexible material could be used for the core 12 besides low carbon steel. The strands of wire in each of the bundles 12a are helically arranged and the bundles 12a are also helically wrapped. By way of example only, and not by way of limitation, the steel wire in the bundles 12a may have a diameter of approximately five thousandths of an inch. The steel wire is coated with black oxide to limit eddy loss. The rearward and forward segments of the core 12 that extend on either side of the coil 14 can flex or bend under relatively minor forces a substantial distance away from the central longitudinal axis of the core 12. The resiliency of the core 12 and the surrounding plastic jacket 20 ensures that the core 12 will return to its straight configuration after it is bent. The flexible nature of the core 12 allows a long effective length which produces a large dipole moment and increased effective radiated power while still enabling the core 12 to bend and negotiate tight turns as the rugged video camera head and trailing flexible-type sonde 10 are forced down a pipe with the push cable. The wire rope core 12 is surrounded by a waterproof jacket 20 made of a suitable insulating plastic material. A pair of insulating plastic cylindrical end caps 22 and 24 (FIGS. 1–3) are tightly press fit over the ends of the jacket 20 and the wire rope core 12 and provide waterproof seals over the ends of the jacket 20. Optionally the end caps 22 and 24 are bonded to the ends of the jacket 20 with adhesive.

Figure 4:
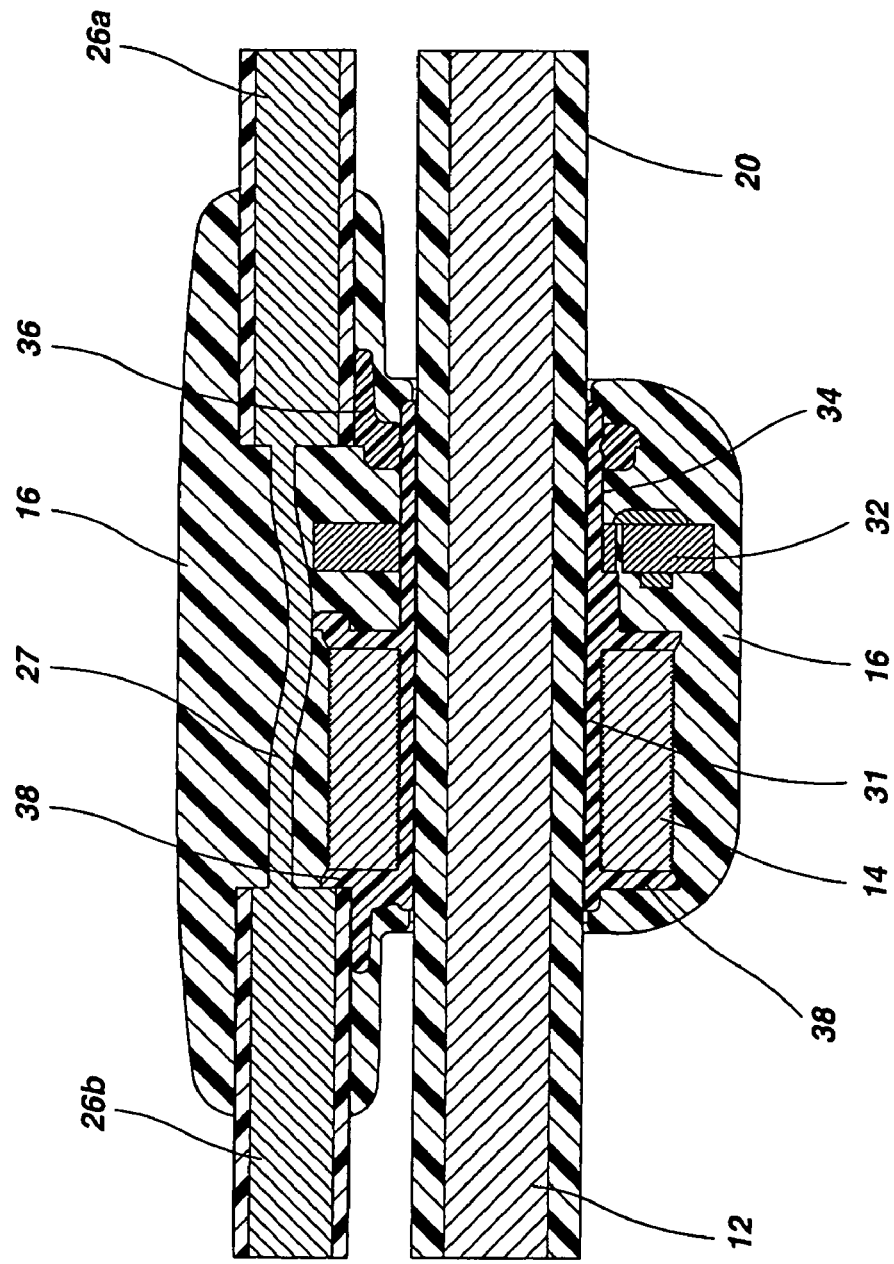
FIG. 4 is an enlarged view of a portion of FIG. 3 showing further details of the coil and mounting of the electronic drive circuit inside of its waterproof housing of the flexible-type sonde of FIG. 1.

An insulated springy electric coil cord 26 has rearward and forward segments 26a and 26b that loosely surround the core 12 and have ends that are over molded by the housing 16. The coil cord 26 contains conductors for supplying power to the electronic drive circuit 18 and the video camera head. The coil cord 26 also contains a conductor for transmitting a video signal from the video camera head. The conductors in the coil cord 26 are illustrated diagrammatically in FIGS. 2 and 4 and denoted with the reference numeral 27. In FIG. 4, the conductors of the cord segments 26a and 26b are shown diagrammatically as a single metal core, although it will be understood that there are multiple separately insulated conductors within the cord 26. The rearward segment 26a of the coil cord 26 has a multi-pin male electrical connector 28 operatively connected thereto. The forward segment 26b of the coil cord 26 has a multi-socket female electrical connector 30 operatively connected thereto. The springy rearward and forward segments 26a and 26b of the coil cord 26 manage or accommodate slack in the interconnect between the distal end of the push cable and the rear end of the video camera head.

The coil 14 is wound about a cylindrical plastic bobbin 31 (FIG. 4) slipped over the waterproof jacket 20 that surrounds the core 12. Alternatively, the coil 14 may be directly wound on top of the waterproof jacket 20 to allow the coil 14 to be formed without the use of a separate bobbin to thereby minimize the build height of the coil 14. The housing 16 comprises a solid mass of suitable plastic material that is injection molded over the electronic drive circuit 18 and the coil 14 to provide a rugged, waterproof enclosure. The electronic drive circuit 18 includes a ring-shaped circuit board assembly 32 with a central aperture. A cylindrical extension 34 of the bobbin 31 snugly extends through the central aperture in the circuit board assembly 32. The circuit board assembly 32 is supported by the bobbin extension 34 and is positioned adjacent the rear end of the coil 14. The plane of the circuit board assembly 32 is substantially normal or perpendicular to the longitudinal axis of the coil 14. The location of the electronic s drive circuit 18 inside the assembly that comprises the flexible-type sonde 10 provides a self-contained operable unit that can be more easily repaired or replaced in the case of failures, instead of providing the electronic drive circuit for the coil 14 with the control system at the proximal end of the push cable.

A plastic clip 36 fits snugly over the rear end of the cylindrical extension 34 after the circuit board assembly 32 has been installed. The clip 36 retains the rearward segment 26a of the coil cord 26. A similar clip 38 is integrally formed on the forward end of the bobbin 31 and retains the forward segment 26b of the coil cord 26. The over molding of the plastic housing 16 serves to firmly lock the bobbin 31, circuit board assembly 32, coil 14, and coil cord segments 26a and 26b firmly in position and ensures that the electronic drive circuit 18 and the electrical connections are free from stresses and moisture that could damage or impair their proper operation.

Thus the core 12, coil 14 and electronic drive circuit 18 are substantially co-axial relative to the central longitudinal axis of the core 12. The coil 14 is centered about the core 12 for maximum electromagnetic signal generating efficiency. This concentric architecture also minimizes the foot print or volume occupied by the flexible-type sonde 10 which yields a compact design required for video pipe inspection equipment.

Figure 6:
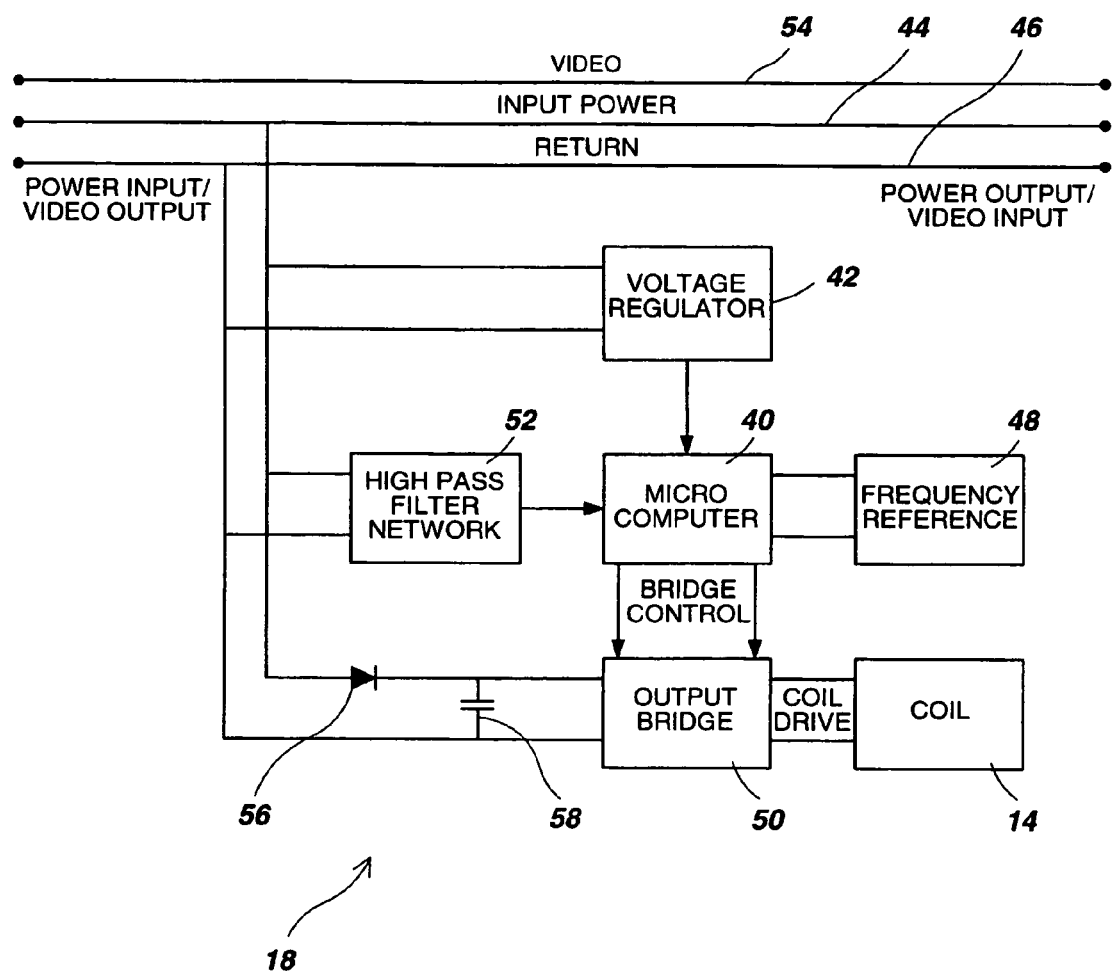
FIG. 6 is a block diagram of the electronic drive circuit of the flexible-type sonde of FIG. 1.

FIG. 6 is a block diagram of the electronic drive circuit 18 of the sonde of FIG. 1. The electronic drive circuit 18 includes various electronic components that are supported and interconnected on the printed circuit board assembly 32, including a micro-computer 40. A voltage regulator 42 is connected to the input power conductor 44 and return power conductor 46 in the coil cord 26 and supplies DC power to the micro-computer 40. The micro-computer 40 is connected to a frequency reference 48 and controls an output bridge 50. The output bridge 50 is used to drive the coil 14 at a predetermined frequency, such as 512 Hz, so that the electromagnetic signals emitted by the ferromagnetic core 12 have sufficient strength to enable the buried flexible-type sonde 10 to readily be located with a hand-held locator. The power signal to the video camera head, which is routed through the flexible-type sonde 10 via conductors 44 and 46, can be modulated to encode commands recognized by the micro-computer 40 that will turn the transmitting function ON and OFF. This is accomplished with the aid of high pass filter network 52. If desired, the flexible-type sonde 10 can be shut down remotely from a control system connected to the proximal end of the push cable in order to limit interference with the video signal transmitted along conductor 54 in the coil cord 26. When MOSFET devices in the output bridge 50 switch OFF a diode 56 prevents energy from feeding back into the input power conductor 44. Instead, this energy is momentarily stored in a capacitor 58. The diode 56 and capacitor 58 are arranged to recover a portion of the energy stored in the coil 14 at the end of each cycle and deliver it back into the coil 14 at the start of the next cycle instead of this energy being dissipated by the internal resistance of the return conductor 46. This arrangement results in a significant increase in the output power of the coil 14.

The electronic drive circuit 18 (FIG. 2) of the flexible-type sonde 10 is supported on the printed circuit board assembly 32 within the waterproof housing 16. However other electronic drive circuit means can be utilized such as a circuit board assembly remote from the flexible-type sonde 10 such as that associated with the inner or proximal end of a push cable as disclosed in co-pending U.S. patent application Ser. No. 10/061,887 previously incorporated herein by reference.

Figure 7:
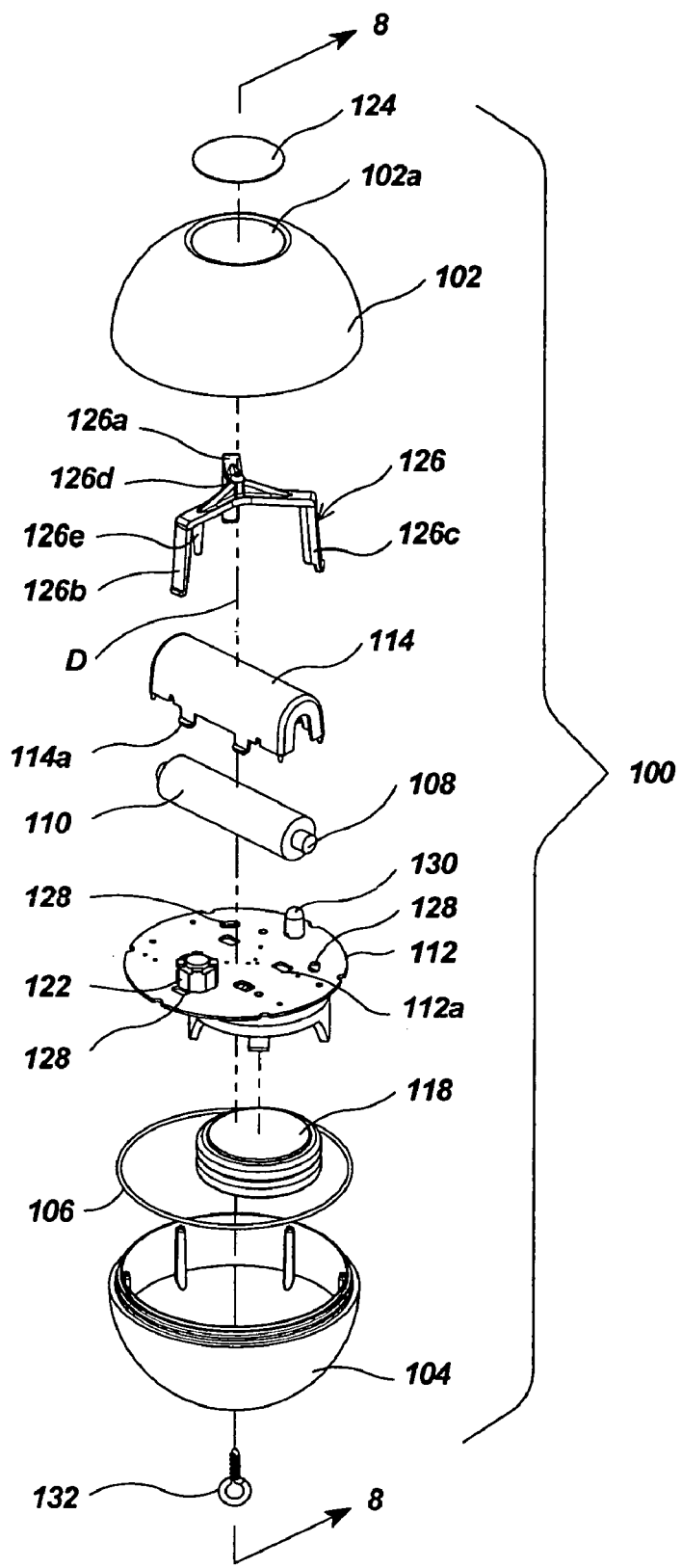
FIG. 7 is an exploded view of a float-type sonde.
Figure 8:
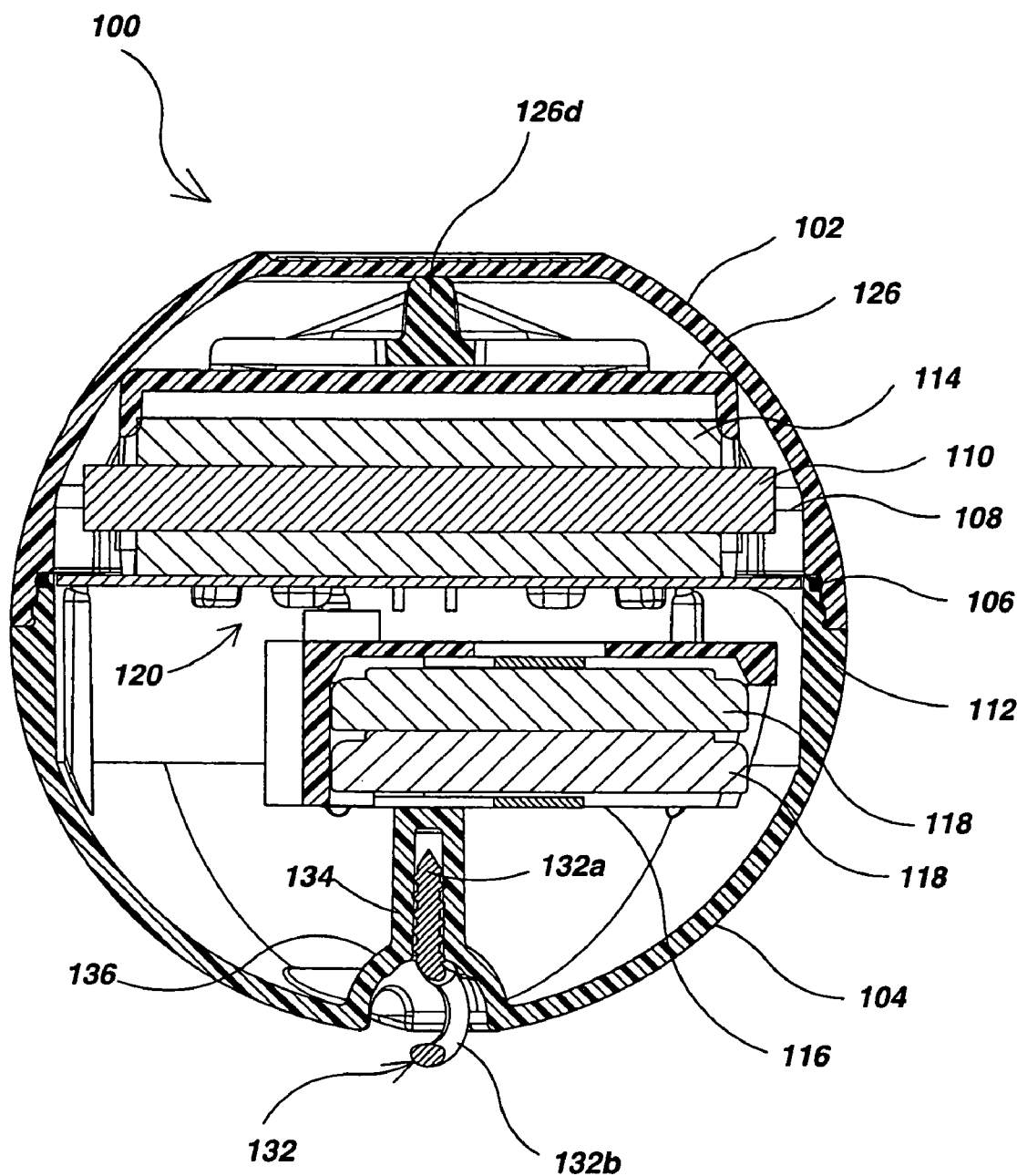
FIG. 8 is an enlarged vertical sectional view of the assembled float-type sonde of FIG. 7 taken along line 8—8 of FIG. 7.

Referring to FIGS. 7 and 8 a float-type sonde 100 includes a water-tight generally spherical float housing made of upper and lower hemispherical plastic shells 102 and 104 and a BUNA O-ring 106 that seals a joint between the shells 102 and 104. The shells 102 and 104 could be glued or screwed together. By way of example, the water-tight buoyant housing formed by the joined plastic shells 102 and 104 may have an outer diameter of approximately one and one-half inches. The small size and round shape of the float-type sonde 100 facilitates rolling of the float-type sonde 100 through both small and large diameter pipes. A rigid cylindrical elongate ferromagnetic core 108 has a coil 110 made of suitably insulated wire that surrounds the core 108. The core 108 and coil 110 are supported on a circuit board assembly 112 mounted within the float housing. A plastic half-cylinder case 114 snugly encases the core and coil 110 and its hook-shaped legs 114*a* snap into rectangular apertures 112*a* in the circuit board assembly 112. A battery holder 116 mounted beneath the circuit board assembly 112 holds two coin cell lithium batteries 118.

An electronic drive circuit 120 (FIG. 8) including electronic components interconnected on the circuit board assembly 112 is powered by the batteries 118 for supplying the coil 110 with an electric signal. The signal is designed to induce the ferromagnetic core 108 to emit electromagnetic signals at a predetermined strength and frequency that can be remotely detected. The float-type sonde 100 is designed with a predetermined buoyancy and a center of gravity so that an axis of the dipole of an electromagnetic field generated by the core 108 is automatically oriented in a generally vertical direction normal to axis D in FIG. 7 as the float-type sonde 100 floats in a body of liquid. This is achieved by locating the relatively heavy lithium coin cell batteries 118 on one side of the circuit board assembly 112 so that they extend mostly within one-half of the spherical float housing. As illustrated in FIG. 8 about three-quarters of the length of the batteries 118 extend to the right side of the vertical axis of a screw eye 132 discussed hereafter. The circuit board assembly 112 is a generally planar structure that substantially spans the equator of the float housing. The equator of the float housing is defined by the mating joint of the upper and lower hemispherical shells 102 and 104. When the float-type sonde 100 floats in a liquid, such as water in a pipe, the central longitudinal axis of the core 108 extends vertically, i.e. perpendicular to the surface of the water in the case of a partially full pipe.

The float-type sonde 100 includes waterproof switch means for activating the electronic drive circuit 120. In the illustrated embodiment the switch means includes a push button switch 122 that is manually actuable by flexing a top circular flat portion 102*a* of the upper plastic shell 102 of the float housing. A decal or label 124 is adhesively adhered to the portion 102*a* to identify this location and function to the user. The flexing is accomplished by squeezing the float-type sonde 100 between the thumb as it overlies the portion 102*a* of the upper shell 102 and the index and middle fingers as they overlie the underside of the lower shell 104. The switch means further includes a three-legged plastic flexure member 126 that transfers a manual inward deflection of the portion 102*a* of the upper shell to depress and actuate the push button switch 122. The flexure member 126 includes three legs 126*a*, 126*b* and 126*c* that have lower ends that lock into apertures 128 in the circuit board assembly 112. An upstanding projection 126*d* (FIG. 8) in the center of the flexure member 126 engages the underside of the flexible portion 102*a* of the upper shell 102. An actuating finger 126*e* (FIG. 7) of the flexure member 126 has a lower end that pushes downwardly on the central reciprocating spring biased button of the push button switch 122.

The float-type sonde 100 further includes means for providing illumination that is mounted behind a transparent portion of the float housing. In the illustrated embodiment an LED 130 (FIG. 7) is mounted on the circuit board assembly 112. The LED 130 is energized using power from the batteries 118 to indicate an operational status of the electronic drive circuit 120, such as ON or OFF. The upper shell 102 can be made of transparent polycarbonate plastic or a clear window can be mounted in an aperture in the upper shell 102 adjacent the LED 130. By way of example, the portion 102*a* can be depressed to turn the float-type sonde 100 ON which will be indicated by an initial flash of the LED 130 followed by a steady illumination of the LED 130. A subsequent depression of the portion 102*a* can turn the float-type sonde 100 OFF at which time the LED 130 will cease being illuminated. Preferably the portion 102*a* must be depressed for a predetermined sufficiently long time period, e.g. several seconds, to ensure against inadvertent triggering of the electronic drive circuit 120.

The float-type sonde 100 includes attachment means for allowing a string to be attached to the water-tight float housing for withdrawing the sonde 100 from a pipe. In the embodiment shown, the attachment means includes the screw eye 132 (FIG. 8) that has a threaded shank 132*a* screwed into a cylindrical sleeve 134 formed in the lower shell 104. The curved part 132*b* of the screw eye 132 is positioned inside an outwardly opening curved receptacle 136 formed in the lower shell 104. The term "string" as used herein includes not only natural fiber strings and cord, but in addition, synthetic lines such as fishing line, small plastic or metal chain, and small gauge wire.

Figure 9:
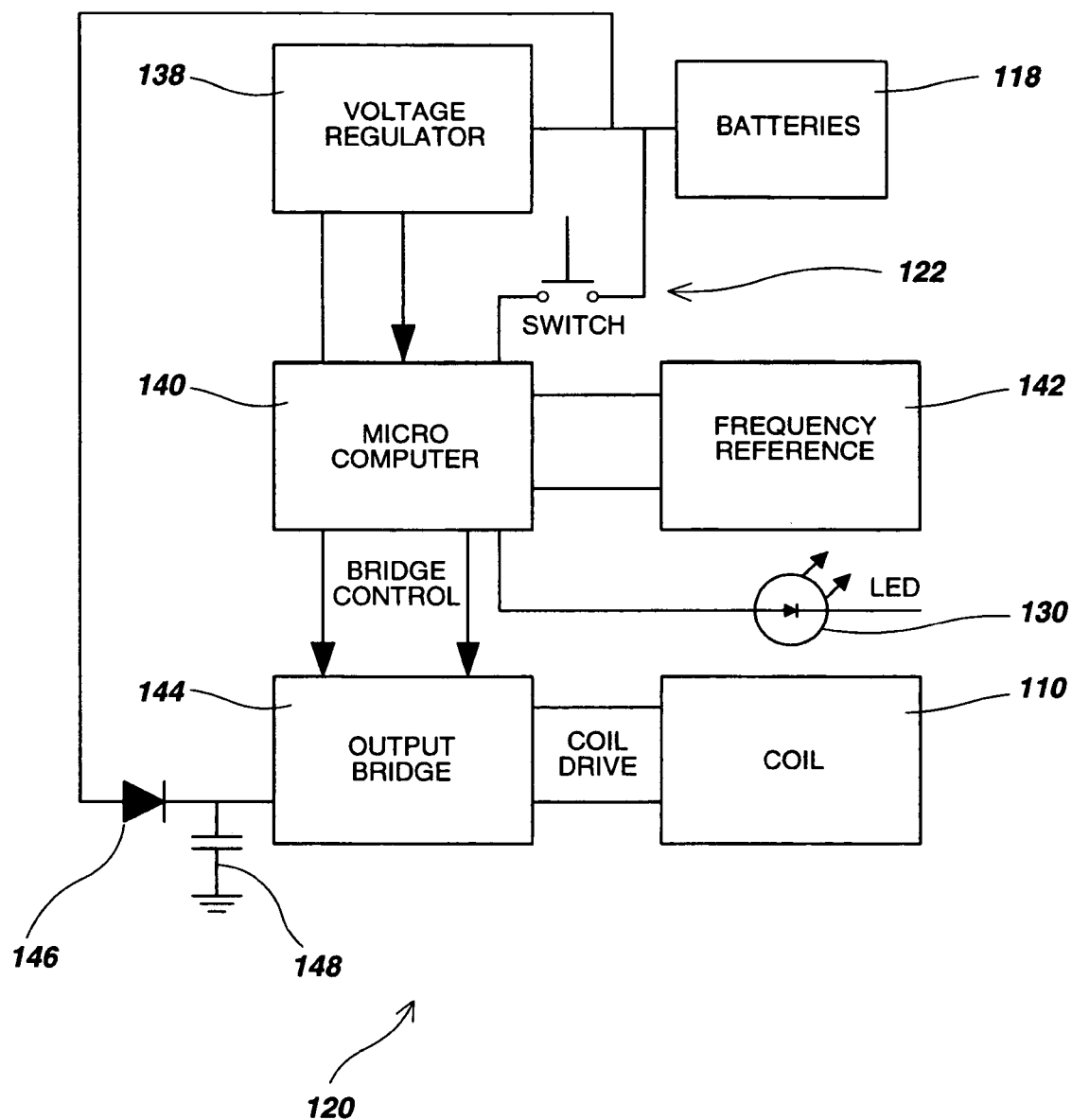
FIG. 9 is a block diagram of the electronic drive circuit of the float-type sonde of FIGS. 7 and 8.

FIG. 9 is a block diagram of the electronic drive circuit 120 of the float-type sonde 100. The batteries 118 supply DC power through a voltage regulator 138 to a micro-computer 140. The micro-computer 140 responds to closure of the push button switch 122 and uses a frequency reference 142 and a bridge drive circuit to drive an output bridge 144. The output bridge 144 in turn drives the coil 110. The micro-computer 140 selectively energizes the LED 130 to indicate the status of the electronic drive circuit 120 to the user. A diode 146 and a capacitor 148 are connected between the output bridge 144 and the batteries 118 and prevent power from feeding back into the batteries 118 when MOSFET devices in the output bridge 120 turn OFF. The diode 146 and capacitor 148 are arranged to recover a portion of the energy stored in the coil 110 at the end of each cycle and deliver it back into the coil 110 at the start of the next cycle instead of this energy being dissipated by the internal resistance of the batteries 118. This results in a significant increase in the output power of the coil 110.

Figure 10:
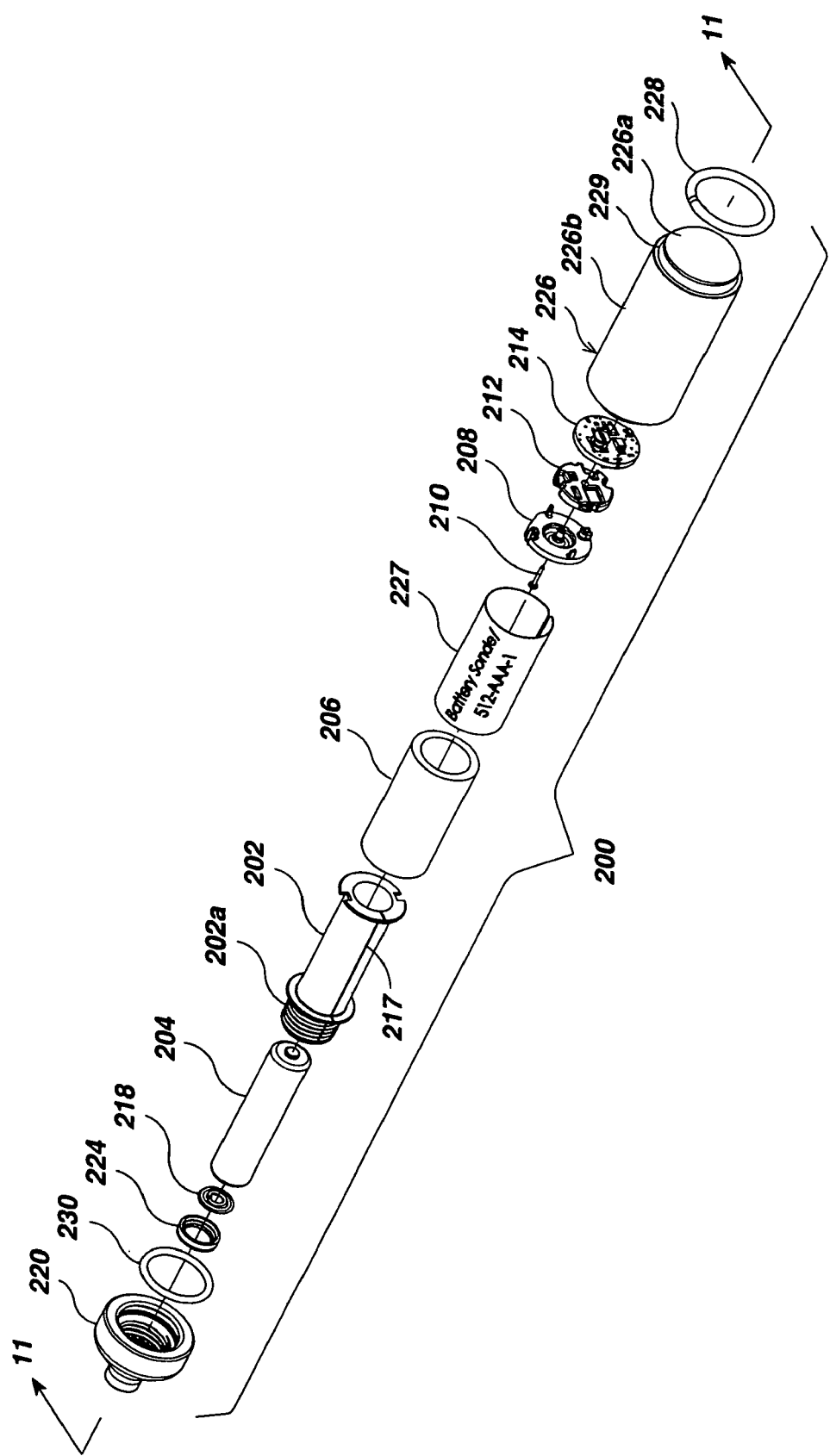
FIG. 10 is an exploded view of a pill-type sonde.
Figure 11:
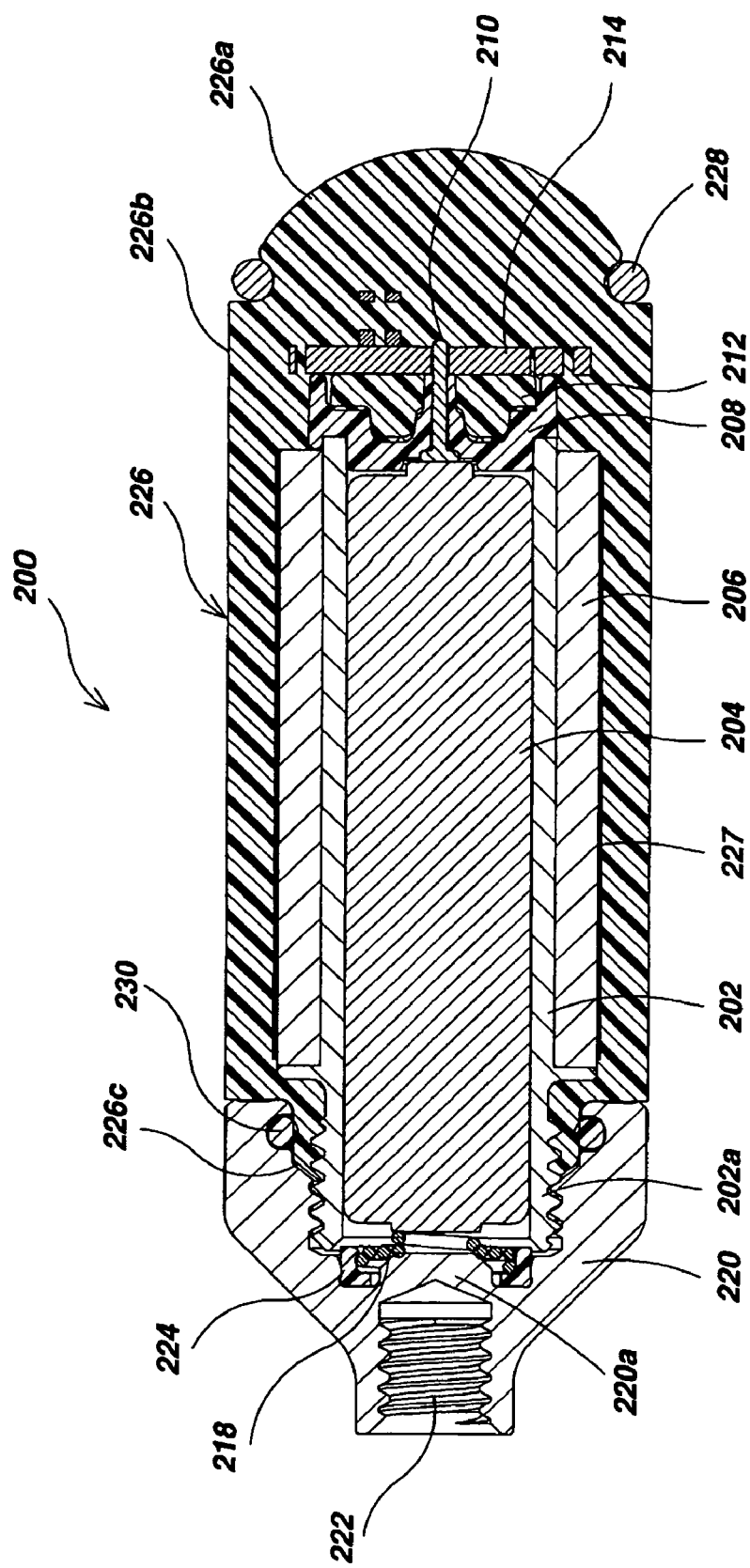
FIG. 11 is an enlarged longitudinal sectional view of the pill-type sonde of FIG. 10 taken along line 11—11 of FIG. 10.

Referring to FIGS. 10 and 11 a pill-type sonde 200 includes a cylindrical hollow tube 202 that removably receives a AAA battery 204. The tube 202 is made of ferromagnetic material, preferably low carbon steel, so that it can function as the core of an electromagnetic transmitter. A coil 206 made of suitably insulated wire is wound directly around the steel tube 202 between forward and rearward radial flanges formed on the steel tube 202. A cylindrical plastic terminal holder 208 fits over the forward end of the steel tube 202 and includes a central positive battery terminal 210 (FIG. 11). A plastic spacer 212 engages a circuit board assembly 214 that also engages the terminal holder 208. Components forming an electronic drive circuit 216 (FIG. 13) are mounted and interconnected on the circuit board assembly 214 (FIGS. 10 and 11). The circuit board assembly 214 has a generally planar disc shape and it extends substantially perpendicular to the central longitudinal axis of the steel tube 202. The electronic drive circuit 216 is longitudinally spaced from an end of the steel tube 202 instead of surrounding the exterior of the tube 202 in order to minimize the overall outer diameter of the pill-type sonde 200. Alternatively, the electronic drive circuit could abut an end of the steel tube 202 if the functions of the terminal holder 208 and spacer 212 were integrated therein. A small outer diameter for the pill-type sonde 200 is desirable so that it can be pushed down the interior of small diameter pipes and negotiate tight turns.

The electronic drive circuit 216 is connected to the coil 206 for driving the same with an oscillating electric signal to induce the steel tube 202 to emit electromagnetic signals with the optimum frequency and strength for tracing. The steel tube 202 preferably has a longitudinally extending gap or slot 217 (FIG. 10) that extends its entire length to reduce eddy losses in the core 202. The electronic drive circuit 216 is connected to the positive battery terminal 210 (FIG. 11) and to a negative battery terminal in the form of a conical coil spring 218.

A female threaded cylindrical stainless steel end cap 220 (FIG. 10) screws over a male threaded rear segment 202a of the steel tube 202. The circumferential outer surface of the steel end cap 220 is knurled to facilitate manual twisting thereof. The coil spring 218 surrounds and engages a central hub portion 220a (FIG. 11) of the steel end cap 220 to hold the same in position and to provide an electrical connection to the negative contact of the battery 204. The steel end cap 220 includes an outwardly opening female threaded bore 222 with standard sized threads to permit the end of a conventional sewer snake (not illustrated) to be connected thereto so that the pill-type sonde 200 can be pushed down a pipe. The end cap 220 may be configured so that the pill-type sonde 200 cannot be coupled to a snake, but instead may rely upon flowing liquid or other pushing means to move the pill-type sonde 200 down the pipe. A cylindrical plastic spacer 224 (FIG. 12A) surrounds and retains the larger diameter outer periphery of the coil spring 218 and prevents electrical contact between this outer periphery and the radially outward portion of the steel end cap 220 as well as the threaded rear segment 202a of the steel tube 202. An outer water-tight housing 226 (FIG. 11) is formed by over molding a layer of transparent polyurethane plastic over the circuit board assembly 214, coil 206 and steel tube 202, except for the rear portion of the threaded rear segment 202a over which the steel end cap 220 is screwed. This plastic material is slightly compliant and therefore provides a degree of shock protection resulting from impacts with the hard pipe wall. A label 227 (FIG. 10) made of high temperature resistant material is wrapped around the coil 206 before over molding the plastic housing 226. The label 227 contains graphic and/or text user instructions, serial number, technical specifications and/or trademarks. The label 227 may be read through the transparent plastic material that forms the housing 226.

A replaceable split metal wear ring 228 is clamped in an annular groove 229 (FIG. 10) formed in the plastic housing 226 between a dome-shaped forward portion 226a and a cylindrical portion 226b thereof. The metal wear ring 228 absorbs the most aggressive contact with the wall of the pipe and lessens the wear on the plastic housing 226. An O-ring 230 is seated in an inwardly opening annular groove in the forward end of the steel end cap 220. The O-ring 230 is squeezed between a smaller diameter rear shoulder 226c (FIG. 11) of the plastic housing 226 and the steel end cap to provide a water-tight seal.

The shape of the plastic terminal holder 208 (FIG. 11) and the recessed position of the central positive battery terminal 210 ensure that a circuit with the electronic drive circuit 216 can only be completed if the battery 204 is inserted in the proper orientation. This feature not only protects components in the electronic drive circuit 216 from reverse voltage, but also enables the battery 204 to be stored inside the pill-type sonde 200 by inserting it into the steel tube 202 in a direction opposite to that illustrated in FIG. 11 so that no electrical circuit is completed and the pill-type sonde 200 remains in an OFF state and does not discharge the battery.

Figure 12A:
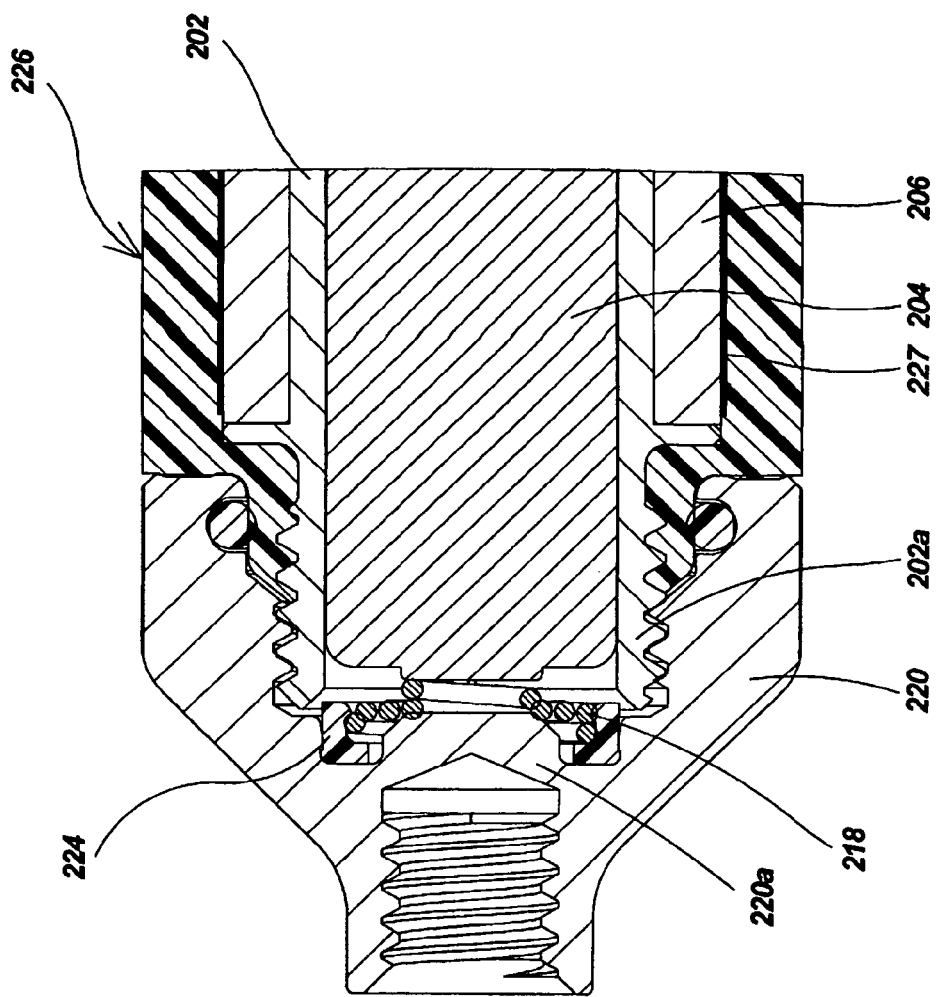
FIGS. 12A and 12B are enlarged portions of FIG. 11 illustrating the ON and OFF conditions, respectively, of the coil spring switch of the pill-type sonde of FIGS. 10 and 11.
Figure 12B:
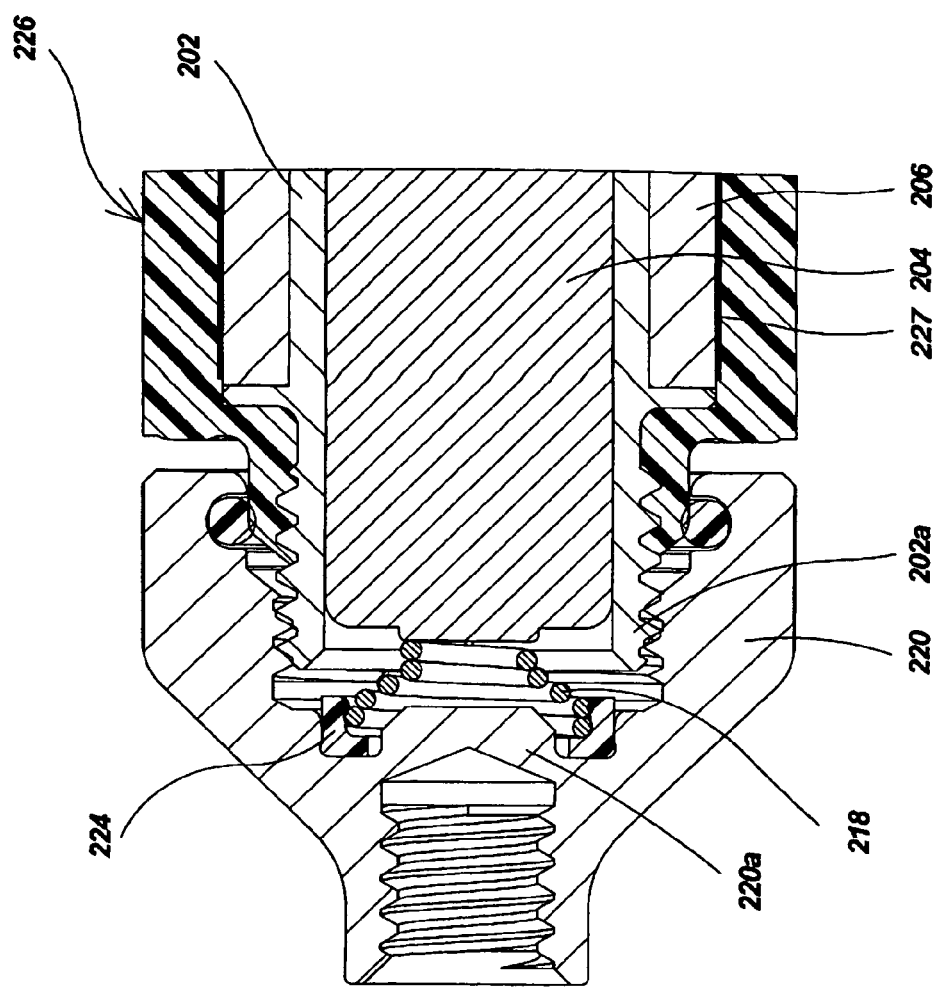

The steel tube 202 (FIG. 10) provides a return electrical path between the electronic drive circuit 216 on the circuit board assembly 214 and the negative terminal of the battery 204, but only when the steel end cap 220 is fully screwed onto the threaded rear segment 202a. This makes the coils of the coil spring 218 collapse on themselves as illustrated in FIG. 12A at which time one or more of the smaller diameter coils in the center of the conical coil spring 218 contact(s) the central hub portion 220a of the steel end cap 220. The forward smaller diameter portion of the conical spring 218 is always in engagement with the negative contact of the battery 204 as illustrated in FIG. 12B. Thus the combination of the steel end cap 220, spacer 224, coil spring 218, threaded rear segment 202a, steel tube 202 provide a water proof manually actuable ON/OFF coil spring switch generally denoted 234 in FIG. 13. FIG. 12A illustrates the ON state of the coil spring switch and FIG. 12B illustrates the OFF condition of the coil spring switch. The mating faces of the steel end cap 220 and the rear shoulder 226c of the plastic housing 226 that extend perpendicular to the central longitudinal axis of the pill-type sonde 200 are preferably formed with radial knurling (not illustrated) that provides a locking action to maintain the coil switch in its ON condition.

Figure 13:
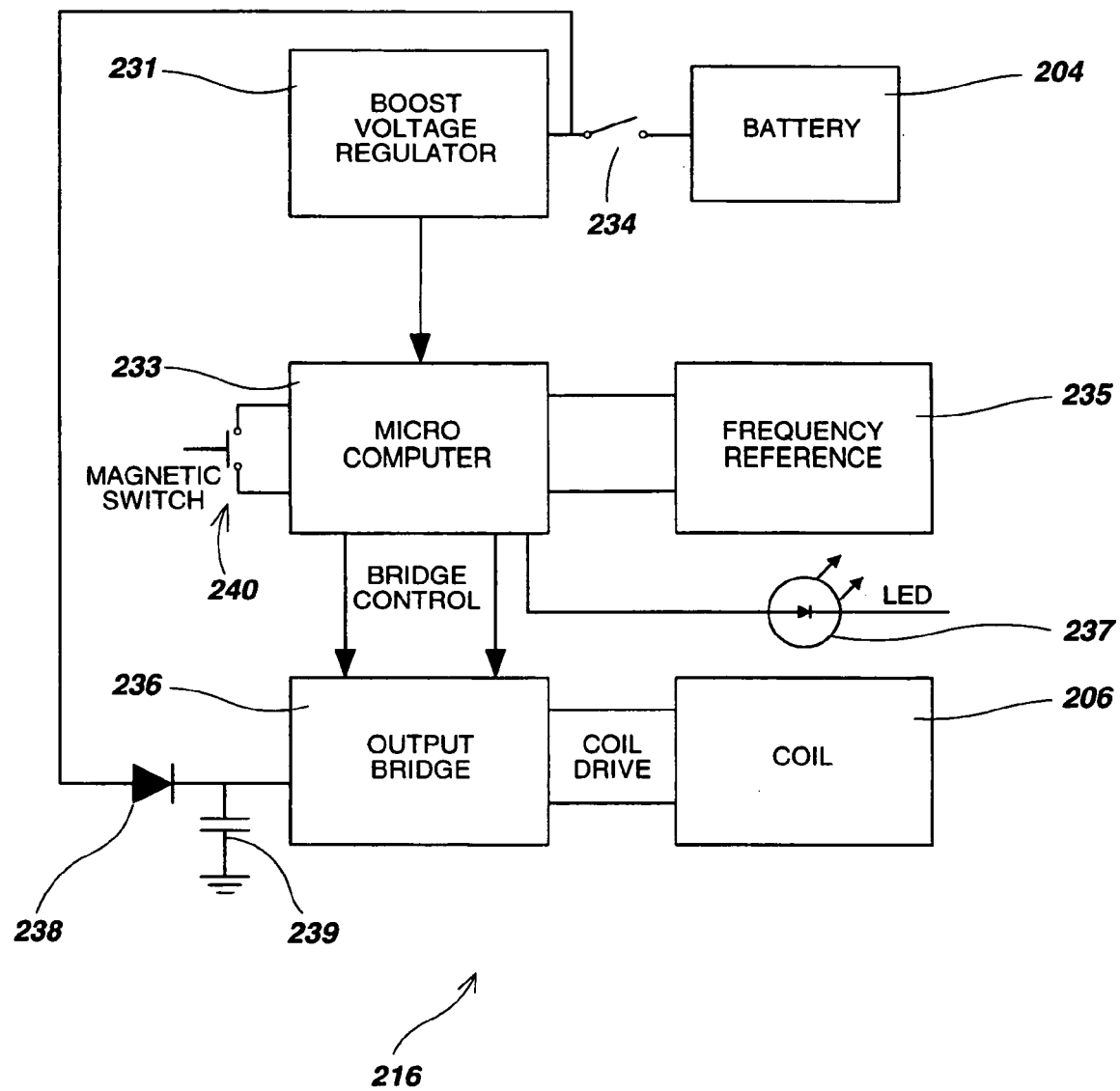
FIG. 13 is a block diagram of the electronic drive circuit of the pill-type sonde of FIGS. 10 and 11.

FIG. 13 is a block diagram of the electronic drive circuit 216. The battery 204 supplies DC power through a boost voltage regulator 231 to a micro-computer 233. Typically a single AAA battery cell will supply 0.9 to 1.5 volts DC power and this signal is converted to a five volt DC signal for the micro-computer 233. The micro-computer 233 responds to closure of the coil spring switch 234 and uses a frequency reference 235 to control an output bridge 236. The output bridge 236 in turn drives the coil 206. The micro-computer 233 also selectively energizes an LED 237 to indicate the status of the electronic drive circuit 216 to the user. The LED 237 is mounted on the circuit board assembly 214 and when energized its illumination is readily visible to the user through the transparent plastic housing 226. Alternatively, the housing 226 could be made of opaque material and a transparent window could be provided in the same adjacent the LED 237. A diode 238 prevents power from being fed back into the battery 204 when MOSFET devices in the output bridge 236 turn OFF and instead this power is momentarily stored in a capacitor 239. The diode 238 and capacitor 239 are arranged to recover a portion of the energy stored in the coil 206 at the end of each cycle and deliver it back into the coil 206 at the start of the next cycle instead of this energy being dissipated by the internal resistance of the battery 204. This significantly increases the power output of the coil 206. As an alternative to the coil switch 234, or in addition to the coil switch 234, the electronic drive circuit 216 may be provided with a magnetic switch 240. The switch 240 may be internal to the water-tight plastic housing 226 and may be actuated by swiping a strong permanent magnet adjacent to the magnetic switch 240

Figure 14:
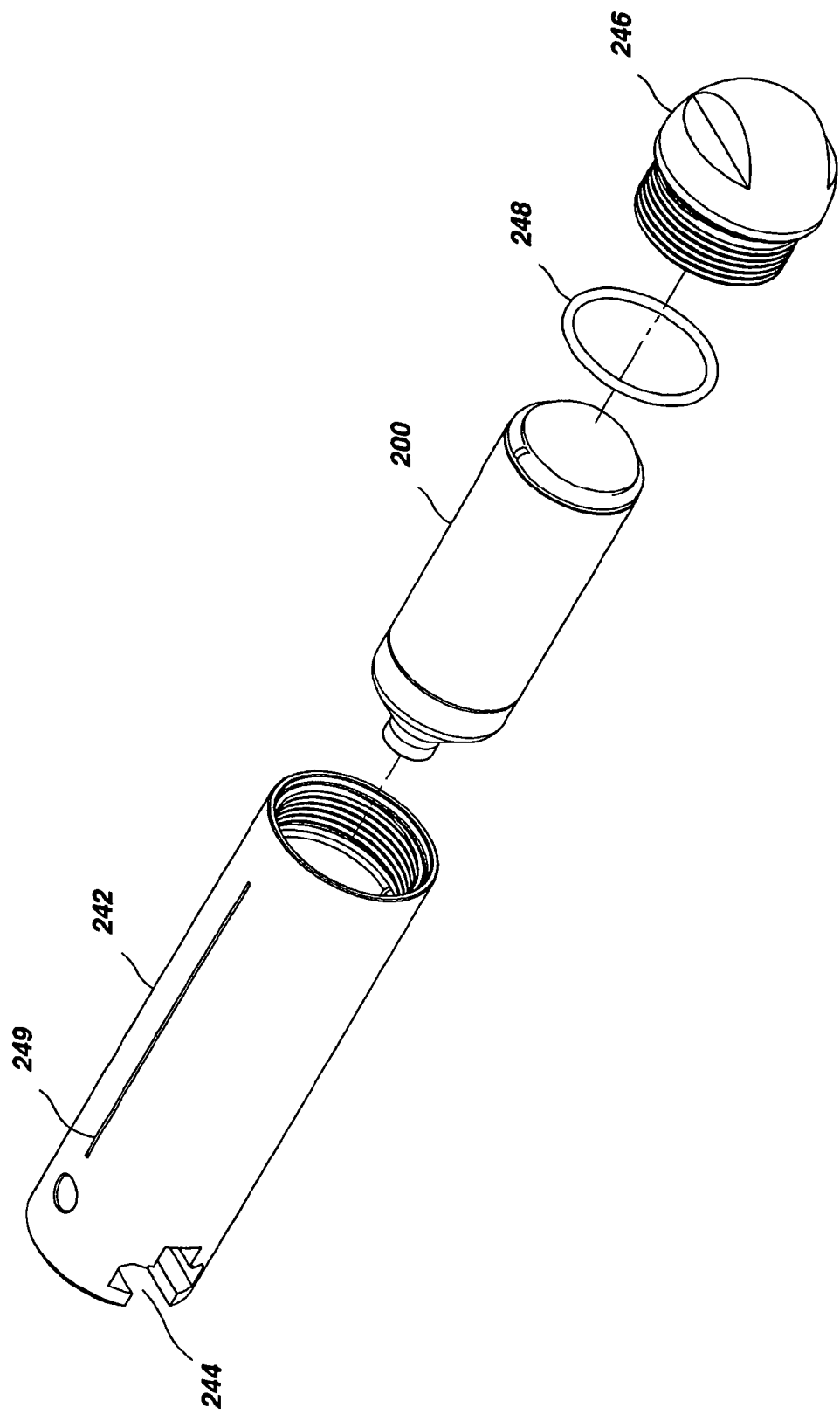
FIG. 14 is an exploded view of a protective outer case for the pill-type sonde of FIGS. 10 and 11.

FIG. 14 illustrates plastic tubular protective outer case 242 with a key shaped slot 244 formed in its sealed rear end for coupling to the coupling adaptor of a drain cleaning machine (not illustrated). The pill-type sonde 200 is inserted into the protective outer case 242 and a male threaded plastic closure plug 246 is screwed into the female threaded forward end of the protective outer case 242. An O-ring 248 provides a friction lock between the plug 246 and the protective outer case 242 to prevent the cap 246 from loosening during use. Substantial torque and sometimes violent motion is imparted to the protective outer case 242 as the drain cleaning machine is used to force the protective outer case 242 down a pipe. The pill-type sonde 200 is thus protected from damage due to hard impacts with the pipe. The protective outer case 242 can be made of plastic or metal. Where the protective outer case 242 is made of steel or other metal, a longitudinal gap or slot 249 reduces eddy losses. The slot 249 does not extend the full longitudinal length of the protective outer case 242.

Figure 15:
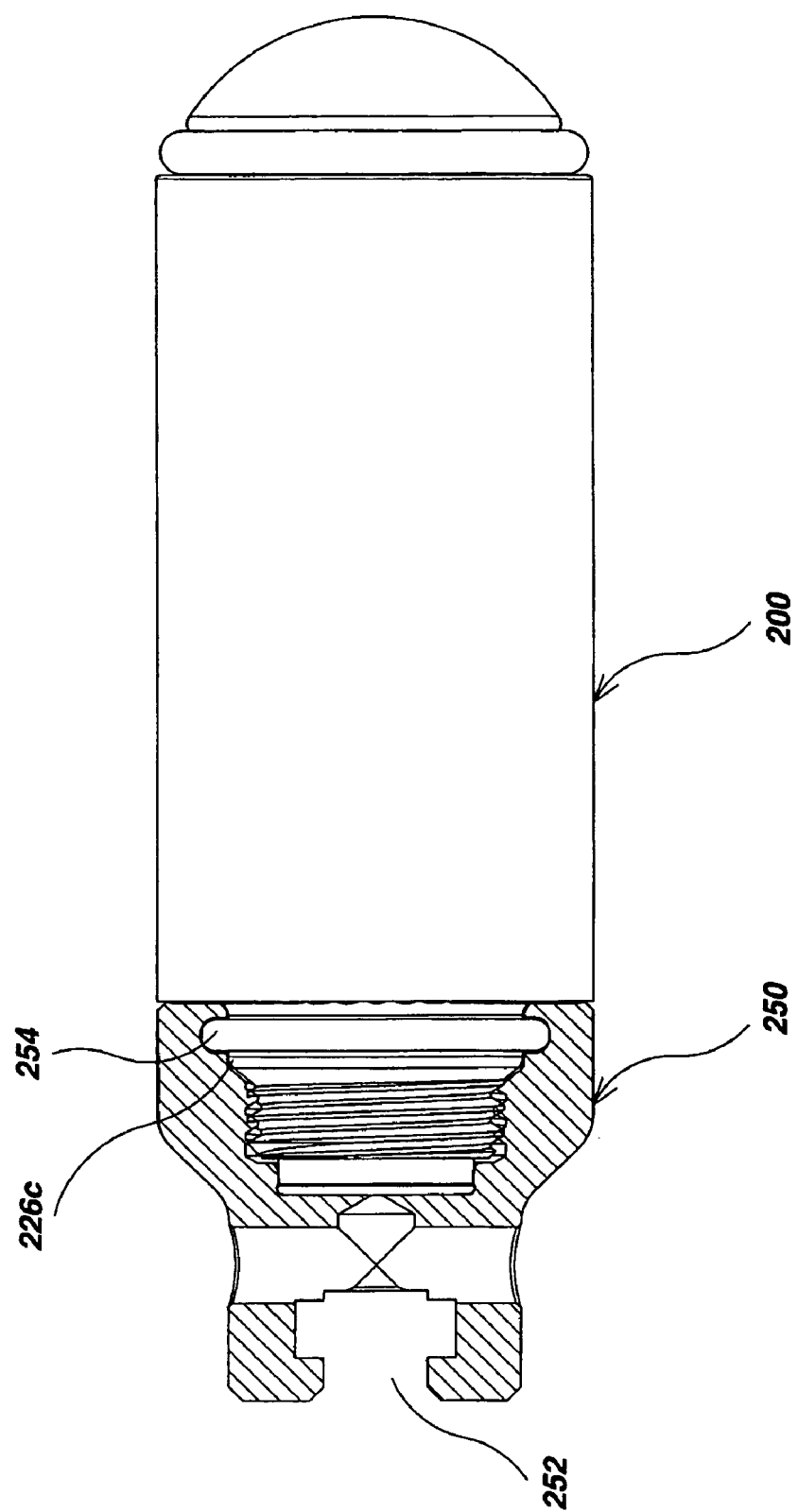
FIG. 15 is an enlarged part longitudinal sectional, part elevation view of the pill-type sonde of FIGS. 10 and 11 illustrating an alternate end cap.

FIG. 15 illustrates an alternate end cap 250 that may be used with the pill-type sonde 200 in place of the end cap 220. The end cap 250 has a key shaped slot 252 for coupling to the coupling adaptor of a drain cleaning machine in situations that cannot accommodate the larger diameter of the protective outer case 242 of FIG. 14. An O-ring 254 (FIG. 15) provides a water-tight seal between the end cap 250 and the shoulder 226c of the transparent plastic housing 226.

The electronic drive circuit could be modified so that the sondes would emit electromagnetic signals at different selected frequencies, either selectively or simultaneously. This can be done to counteract the fact that certain pipe materials tend to attenuate one electromagnetic frequency more than another. A dual frequency waveform could be utilized to drive the coil. Since the sondes described herein use a micro-computer to drive the coil, complex waveforms can be generated by making software changes. Higher harmonics of a square wave driven sonde can be utilized as an efficient way to transmit more than one frequency at a time. The radiated power of pre-selected harmonic frequencies can be increased, such as odd harmonics, to enhance the ability to locate the sonde in particular environments. Pulse width modulation could be utilized to generate a wide variety of waveforms with good control of multiple frequencies, their harmonics and their inter-modulation products.

Sondes incorporating our improvements could also be constructed that would emit swept frequency or pseudo-random frequency electromagnetic signals. The LED in the sonde can indicate not only the ON or OFF status of the sonde, but in addition, the operating frequency of the sonde. A method of locating a multi-frequency sonde can entail detecting a fundamental frequency and at least one of its higher harmonics. This can be accomplished using the difference in detected amplitude between the detected frequencies to determine if the sonde is in an electrically conductive or electrically non-conductive pipe. The results of this analysis can be displayed to the user.

Figure 16:
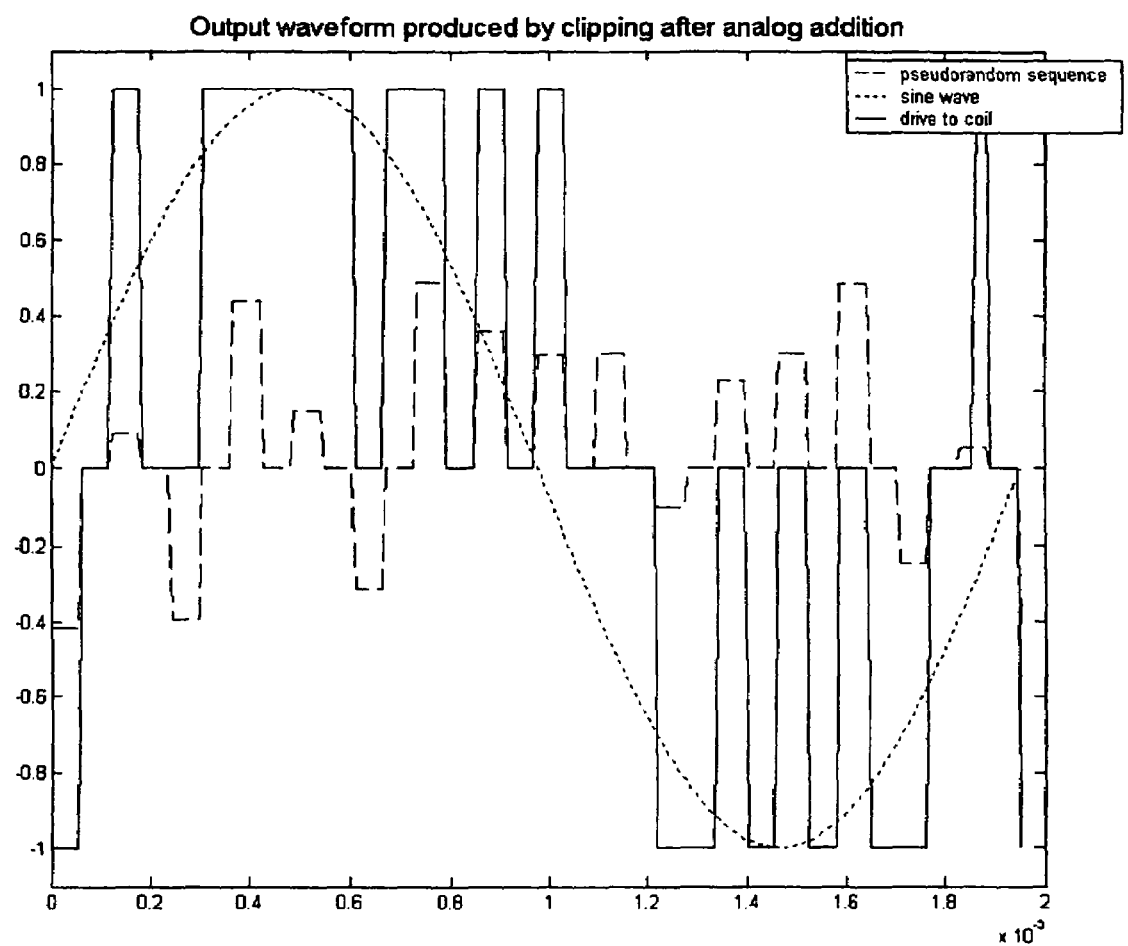
FIGS. 16–19 are wave form diagrams that illustrate coil drive signals that may be used with the sondes disclosed herein.
Figure 17:
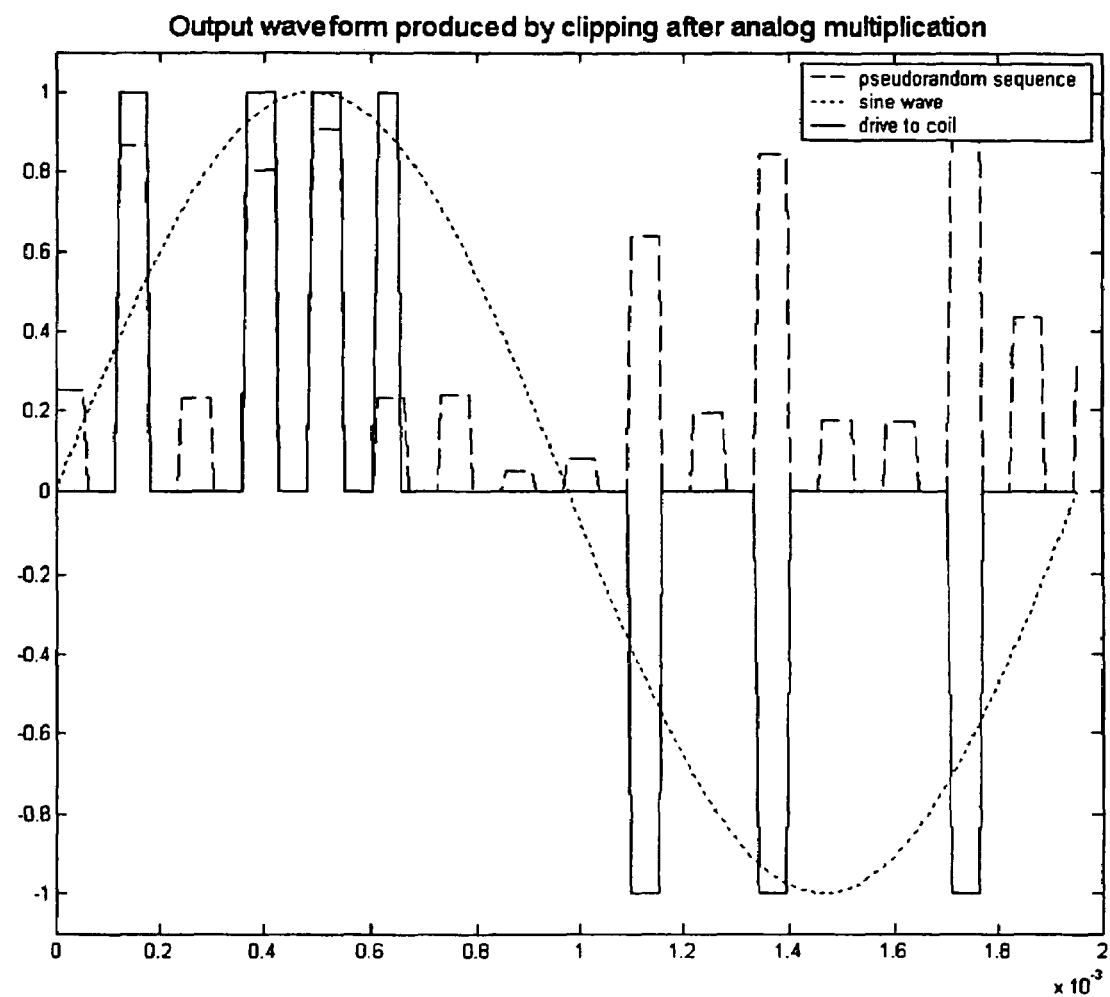

FIGS. 16 and 17 illustrate waveforms that may be used for the drive signals for the coils of the sondes disclosed herein. FIG. 16 illustrates a waveform produced by clipping after analog addition. FIG. 17 illustrates a waveform produced by clipping after analog multiplication. The waveforms of FIGS. 16 and 17 incorporate a broad band wave form output in addition to the primary output frequency. The broadband waveform is produced by using a pseudo-random sequence to modulate the primary output frequency. The pseudo-random sequence appears as broadband noise under frequency analysis. This allows a conventional locator which would ignore the added broadband signal, to find the sonde without difficulty. However, a more sophisticated locator can be provided that will analyze the attenuation pattern of the broadband waveform relative to the primary frequency and determine the composition of the pipe containing the sonde, e.g. plastic versus cast iron. Such a sophisticated locator could also determine soil composition, density and moisture content. Other forms of modulation, such as frequency modulation or phase modulation, could be used to accomplish similar objectives.

Figure 18:
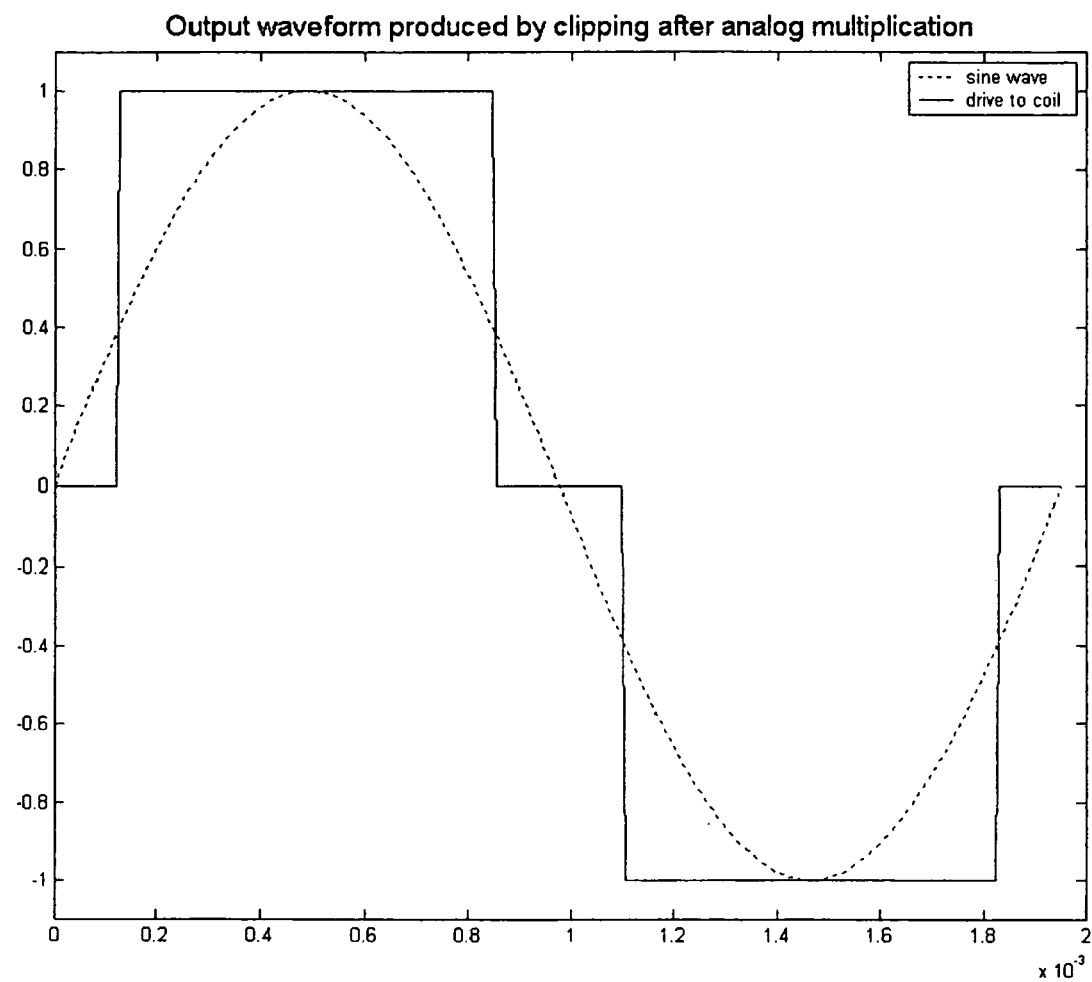

Using a square wave to drive one of the sondes generates a sine wave at the fundamental frequency of the sonde, in addition to all of the odd harmonics (or odd integer multiples) of the fundamental frequency. FIG. 18 illustrates a drive waveform produced by clipping after analog multiplication which reduces harmonic content in the waveform and thereby increases the amount of energy available for detection by a conventional locator. This is accomplished by decreasing the amount of energy that is dissipated out-of-band. Since a conventional locator only detects energy over a narrow frequency range, energy in the harmonics is wasted.

Figure 19:
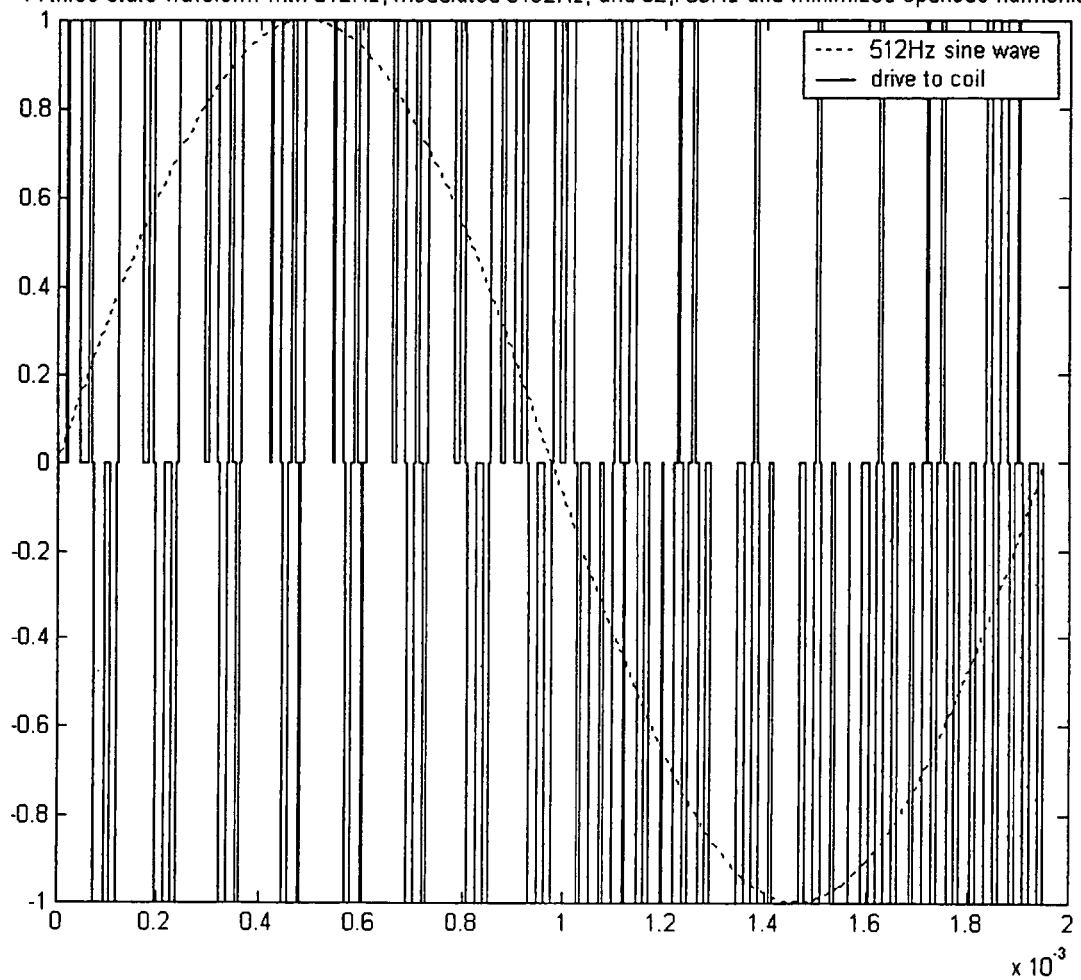

FIG. 19 illustrates a three state waveform generated with intelligent clipping that has a 512 Hz component, a modulated 8,192 Hz component, and 32,768 Hz component, with minimized spurious harmonics. This technique can be used to either determine the composition of the pipe containing the sonde or the soil. It also allows a locator to find the sonde using any of these frequencies. FIG. 19 also illustrates amplitude modulation of one of the output frequencies by a sub-harmonic. Signals having a waveform such as that illustrated in FIG. 19 can be used to drive the coil of a sonde or can be directly connected to a wire to search for jacket defects or to a pipe to find coating holidays. The concepts described in the past several paragraphs are not limited to use in sondes but are also applicable to use in transmitters used to locate pipes and cables via line tracing.

While we have described and illustrated several embodiments of an improved sonde, variations and modifications thereof will occur to those skilled in the art. For example, a sonde could be constructed incorporating our improvements that would utilize electronic drive circuit means including a motor that rotates permanent magnets to generate electromagnetic signals at very low frequencies, such as 4 Hz, which can be difficult to generate with conventional electrical circuitry. Low frequencies are particularly useful in the case where the pipe in which the sonde will be located is made of ductile iron. Therefore the protection afforded our invention should only be limited in accordance with the scope of the following claims.

We claim:

1. A sonde, comprising:
    a water-tight generally spherical float housing;
    a ferromagnetic core mounted inside the float housing;
    a coil surrounding the core;
    means mounted inside the float housing for holding a battery; and
    electronic drive circuit means mounted inside the float housing and powered by the battery for supplying the coil with an electric signal that will induce the core to emit electromagnetic signals at a predetermined strength and frequency that can be remotely detected.

2. The sonde of claim 1 wherein a buoyancy and a center of gravity of the sonde are selected so that an axis of the dipole of an electromagnetic field generated by the core is automatically oriented in a predetermined direction as the sonde floats in a body of liquid.

3. The sonde of claim 1 wherein the electronic drive circuit means includes a diode and capacitor arranged to recover a portion of the energy stored in the coil at the end of each cycle in the electric signal and deliver it back into the coil at the start of the next cycle in order to increase an output power of the coil.

4. The sonde of claim 1 and further comprising waterproof switch means for activating the electronic drive circuit means.

5. The sonde of claim 1 wherein the switch means comprises a switch which is manually actuable by flexing a portion of the float housing.

6. The sonde of claim 5 wherein the switch means includes a flexure member that transfers a manual deflection of a portion of the float housing to depress a push button switch.

7. The sonde of claim 1 and further comprising means for providing illumination mounted behind a transparent portion of the float housing, and means for energizing the illumination means using power from the battery to indicate a status of the electronic drive circuit means.

8. The sonde of claim 1 wherein the float housing includes attachment means for allowing a string to be attached for withdrawing the sonde from a pipe.

9. The sonde of claim 1 wherein the core, coil, and electronic drive circuit means are supported on a circuit board assembly mounted within the float housing.

10. The sonde of claim 1 wherein the float housing includes upper and lower hemispherical shells and an O-ring sealing a joint between the shells.

11. A sonde, comprising:
    a ferromagnetic core;
    a coil surrounding the core;
    a housing surrounding the core, the housing being dimensioned and configured for flushing down a pipe;
    a holder inside the housing for at least one battery; and
    electronic drive circuit means mounted inside the housing and powered by the battery for supplying the coil with an electric signal that will induce the core to emit electromagnetic signals at a predetermined strength and frequency that can be remotely detected, including means for providing illumination mounted behind a transparent portion of the housing, means for energizing the illumination means using power from the battery to indicate a status of the electronic drive circuit means and a diode and capacitor arranged to recover a portion of the energy stored in the coil at the end of each cycle in the electric signal and deliver it back into the coil at the start of the next cycle in order to increase an output power of the coil.

12. The sonde of claim 11 wherein the entire housing is made of a transparent material.

13. The sonde of claim 11 wherein the transparent portion of the housing is a window.

14. The sonde of claim 11 wherein the means for providing illumination is an LED.

15. The sonde of claim 11 wherein the status of the electronic drive circuit means is selected from the group consisting of ON, OFF, and an operating frequency of the sonde.

* * * * *